US012694707B1

(12) United States Patent (10) Patent No.: US 12,694,707 B1

Ozawa et al. (45) Date of Patent: Jul. 28, 2026

(54) BIOMETRIC READER WITH MICRO-ELECTROMECHANICAL SYSTEM (MEMS) COMPONENTS

(71) Applicant: Adeia Guides Inc., San Jose, CA (US)

(72) Inventors: Toshiro Ozawa, Irvine, CA (US); Ning Xu, Irvine, CA (US); Jean-Yves Couleaud, Mission Viejo, CA (US); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/249,711

(22) Filed: Jun. 25, 2025

(51) Int. Cl.
| | |
|---|---|
| G06V 40/12 | (2022.01) |
| G06V 40/13 | (2022.01) |
| G06V 40/20 | (2022.01) |
| G06V 40/70 | (2022.01) |

(52) U.S. Cl.
CPC ...... G06V 40/1376 (2022.01); G06V 40/1312 (2022.01); G06V 40/1335 (2022.01); G06V 40/20 (2022.01); G06V 40/70 (2022.01)

(58) Field of Classification Search
CPC .......... G06V 40/1376; G06V 40/1312; G06V 40/1335; G06V 40/20; G06V 40/70
See application file for complete search history.

(56) References Cited

U.S. PATENT DOCUMENTS

| | | | |
|---|---|---|---|
| 6,720,712 | B2 | 4/2004 | Scott et al. |
| 7,738,681 | B1 | 6/2010 | Rannow et al. |
| 9,678,591 | B2 | 6/2017 | Nikoozadeh et al. |
| 10,552,658 | B2 | 2/2020 | Strohmann et al. |
| 2012/0092350 | A1* | 4/2012 | Ganapathi .......... G06F 3/04146 |
| | | | 29/829 |
| 2014/0362013 | A1* | 12/2014 | Nikoozadeh .......... G06K 19/07 |
| | | | 345/173 |
| 2018/0276439 | A1* | 9/2018 | Strohmann ............. G06F 1/169 |
| 2021/0097257 | A1* | 4/2021 | Gupta ................... G06V 40/13 |
| 2022/0222966 | A1* | 7/2022 | Wang ................ G06V 40/1318 |

OTHER PUBLICATIONS

"2025 Genesis GV60", Technology, Retrieved from: https://www.genesis.com/us/en/gv60#technology, Retrieved on Jul. 3, 2025 (23 pages).
"Tapo DL130 PalmKey Smart Door Lock", TP-Link, Retrieved from: https://www.tp-link.com/us/home-networking/cloud-camera/tapo-dl130/, Retrieved on Jul. 3, 2025 (9 pages).

(Continued)

*Primary Examiner* — Abhishek Sarma

(74) *Attorney, Agent, or Firm* — HG LAW LLP

(57) ABSTRACT

Methods, systems, and other techniques for providing a biometric reader (e.g., a fingerprint reader) with MEMS components are described herein. An example device includes MEMS components configured to actuate based on detecting contact of a finger with the surface of the device. Control circuitry of the device is configured to detect a finger contacting the surface of the device; identify MEMS components corresponding to the location of the contact; cause the corresponding MEMS components to actuate; measure, using the MEMS components, topography of the finger; detect a fingerprint profile based on the measured topography of the finger; and authenticate the user based at least in part on determining that the measured fingerprint profile corresponds to a registered fingerprint profile.

20 Claims, 11 Drawing Sheets

(56) References Cited

OTHER PUBLICATIONS

"U-Bolt Pro Series", Technology, U-tec, Retrieved from: https://u-tec.com/products/ultraloq-u-bolt-pro-series, Retrieved on Jul. 3, 2025 (16 pages).

Nateri et al., "Design of Novel High Sensitive MEMS Capacitive Fingerprint Sensor", IJE Transactions B: Applications, 25(3):167-174 (2012).

Sato et al., "MEMS Fingerprint Sensor Immune to Various Finger Surface Conditions", IEEE Transactions on Electron Devices, 50(4):1109-1116 (2003).

Schultz et al., "Fabrication of 3D Fingerprint Phantoms via Unconventional Polycarbonate Molding", Scientific Reports, Jun. 25, 2018 Volume (9 pages).

Song et al., "A Novel Piezoresistive MEMS Pressure Sensors Based on Temporary Bonding Technology", Sensors, Jan. 7, 2020, (10 Pages).

U.S. Appl. No. 19/255,140, filed Jun. 30, 2025, Titled: "Interactive Tactile Devices" (Not provided; USPTO in possession of specification, claims and prosecution history).

* cited by examiner

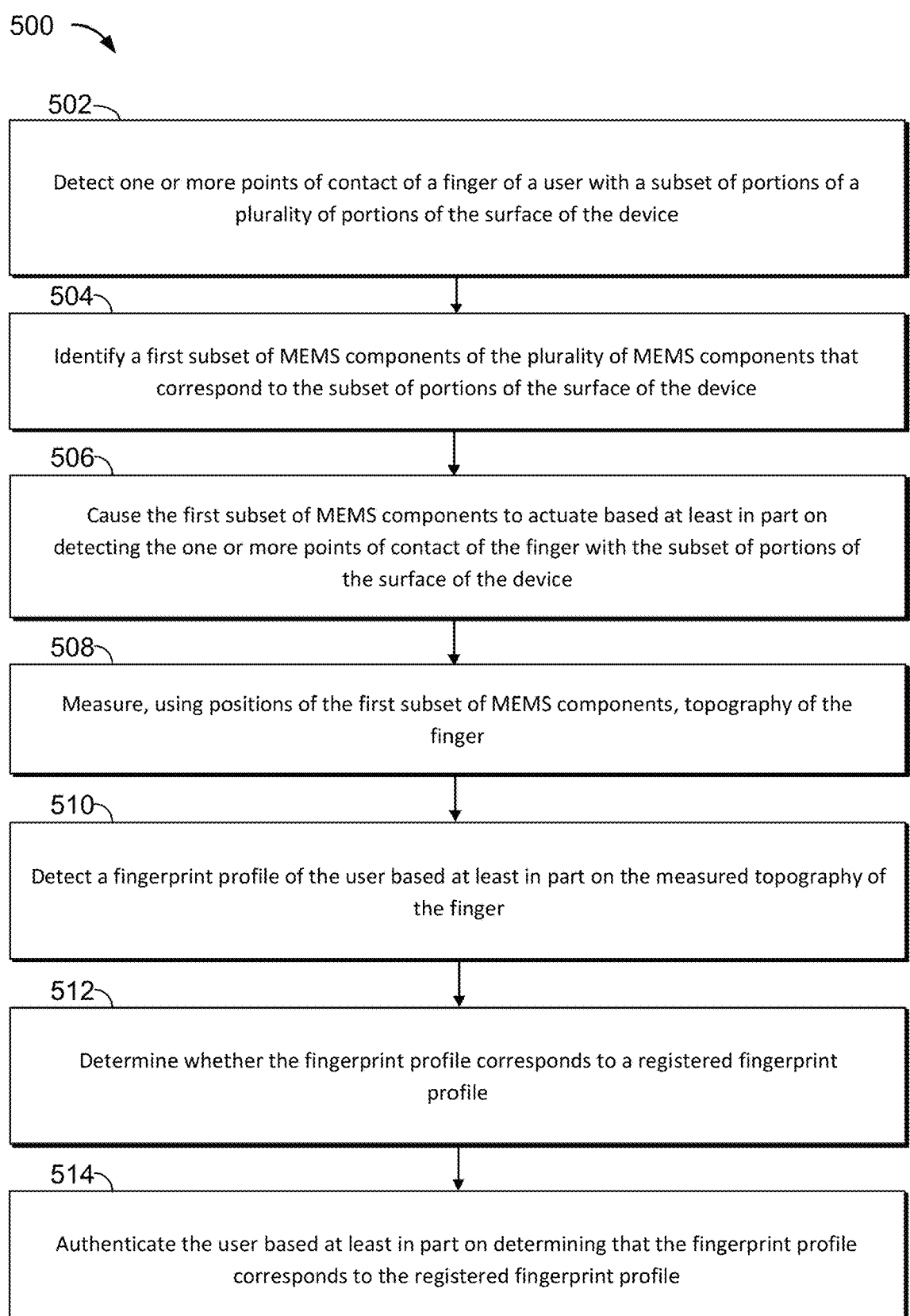

500

502

Detect one or more points of contact of a finger of a user with a subset of portions of a plurality of portions of the surface of the device

504

Identify a first subset of MEMS components of the plurality of MEMS components that correspond to the subset of portions of the surface of the device

506

Cause the first subset of MEMS components to actuate based at least in part on detecting the one or more points of contact of the finger with the subset of portions of the surface of the device

508

Measure, using positions of the first subset of MEMS components, topography of the finger

510

Detect a fingerprint profile of the user based at least in part on the measured topography of the finger

512

Determine whether the fingerprint profile corresponds to a registered fingerprint profile

514

Authenticate the user based at least in part on determining that the fingerprint profile corresponds to the registered fingerprint profile

Detect movement of the finger on the surface of the device

524

Determine whether the movement of the finger corresponds to a registered movement

526

Authenticate the user based at least in part on determining that the detected movement of the finger corresponds to the registered movement

BIOMETRIC READER WITH MICRO-ELECTROMECHANICAL SYSTEM (MEMS) COMPONENTS

BACKGROUND

The present disclosure is directed to methods, systems, and other techniques for providing biometric sensing or scanning (e.g., fingerprint reading) using micro-electromechanical systems (MEMS) components or actuators. Biometric sensing functionality as disclosed herein may be incorporated into display, for example.

SUMMARY

As the use of personal digital technologies increases in everyday life, there is a growing need to ensure the security and protection of personal digital technology users. As a result, biometric authentication technologies have grown along with the increase of personal digital technologies. For example, some approaches include fingerprint scanning, facial recognition, retina scanning, iris recognition, and palm vein recognition. Of these approaches, fingerprint scanning has often been used for device security by offering a fast and reliable method for user authentication. However, the use of fingerprint sensors on smartphones and other compact devices has declined in favor of alternative approaches like facial recognition, largely due to spatial constraints of modern device design.

Despite this shift, fingerprint authentication-based approaches have unique advantages over other biometric authentication technologies. For example, fingerprint scanning is more effective than facial recognition in scenarios involving masks, glasses, heavy makeup, or poor lighting conditions. Additionally, fingerprint scanning does not rely on a camera or advanced sensors (e.g., infrared cameras), making fingerprint scanning potentially a more cost-effective solution than, for example, facial recognition, retina scanning, iris recognition, and palm vein recognition. Fingerprint authentication may be incorporated into devices, such as smartphones, tablets, laptops, smart locks, vehicles, or another suitable device or combination thereof, for convenience in providing access, verification, authorization, and/or security. Some fingerprint scanning approaches, however, fail to operate on certain occasions. For example, if a user's finger is wet, sweaty, dirty, statically charged, and/or in a humid environment, the fingerprint scanner may fail to recognize a registered fingerprint. Furthermore, in the aforementioned fingerprint scanning approaches, fingerprint reading mechanisms are often not located in the same area (or multiple desired areas of the display) where other display elements (e.g., pixels) are located, e.g., the fingerprint sensor is installed at an alternative location than the screen, thus increasing the necessary surface area for a device to provide both screen elements and one or more fingerprint readers.

To help address these issues, displays, apparatuses, methods, and systems providing a fingerprint reader with MEMS components are provided herein. In some embodiments, the fingerprint reader with MEMS components may read friction ridge skin (e.g., distinctive or specialized skin on the fingers, palms, and soles of the feet). For example, the fingerprint reader with MEMS components may be incorporated into a device (e.g., a display or another suitable surface of the device). The device described herein may comprise a plurality of MEMS components, and control circuitry. In some embodiments, each respective MEMS component of the plurality of MEMS components is configured to actuate to cause one or more portions of a surface of the device to move or change position. The control circuitry may be configured to detect one or more points of contact of a finger of a user with a subset of portions of a plurality of portions of the surface of the device. The control circuitry may be further configured to identify a first subset of MEMS components of the plurality of MEMS components that correspond to the subset of portions of the surface of the device. The control circuitry may be further configured to cause the first subset of MEMS components to actuate based at least in part on detecting the one or more points of contact of the finger with the subset of portions of the surface of the device. The control circuitry may be further configured to measure, using positions of the first subset of MEMS components, topography of the finger. The control circuitry may be further configured to detect a fingerprint profile of the user based at least in part on the measured topography of the finger. The control circuitry may be further configured to determine whether the fingerprint profile corresponds to a registered fingerprint profile. The control circuitry may be further configured to authenticate the user based at least in part on determining that the fingerprint profile corresponds to the registered fingerprint profile.

Such aspects enable using MEMS components to perform fingerprint scanning/mapping at any location on the surface of a device, e.g., where MEMS components are located, such as at various positions of a display, thus mitigating space constraints for integrating the fingerprint scanner into the device or specific portions of the display. Such aspects further enable direct measurement of the ridges and valleys (e.g., friction ridge skin) of one or more fingerprints through actuating (e.g., raising or lowering) the vertical positions of the MEMS components. A direct measurement of the fingerprint may be better suited to scan (e.g., generate a three-dimensional (3D) or two-dimensional (2D) mapping) wet, sweaty, dirty, and/or statically charged fingers than indirect fingerprint scanning approaches.

In some approaches, the control circuitry may be further configured to detect movement of the finger on the surface of the device and determine whether the movement of the finger corresponds to a registered movement. The control circuitry to authenticate the user may be further configured to determine that the detected movement of the finger corresponds to the registered movement. In some embodiments, to detect movement of the finger on the surface of the device, the control circuitry is further configured to detect one or more points of contact of the finger with one or more adjacent subsets of portions of the plurality of portions of the surface of the device. The control circuitry is further configured to identify one or more second subsets of MEMS components of the plurality of MEMS components that correspond to one or more edge portions of the one or more adjacent subsets of portions of the surface of the device. The control circuitry is further configured to use the one or more second subsets of MEMS components to detect a gesture profile of the movement. Such aspects enable using MEMS components to additionally perform gesture recognition at any location on the surface a device, thus providing two-factor authentication (2FA) to increase the security of devices and systems by requiring two independent forms of verification (e.g., a gesture and a fingerprint).

In some embodiments, the first subset of MEMS components of the plurality of MEMS components comprises: (a) one or more second MEMS components that correspond to the subset of portions of the surface of the device, at which the one or more points of contact are detected, and (b) one or more third MEMS components that correspond to a fingerprint profile area generally centered relative to the first subset of MEMS components. The control circuitry is further configured to cause the one or more second MEMS components and the one or more third MEMS components to actuate in a pattern comprising at least one of actuating the MEMS components all at once, actuating the MEMS components in a sequence, actuating the MEMS components intermittently, actuating the MEMS components in a wave pattern, actuating the MEMS components in a ring pattern, actuating the MEMS components in a row pattern, actuating the MEMS components in a columnar pattern, or actuating the MEMS components in a diagonal pattern. In some embodiments, control circuitry may be configure to actuate the MEMS components in a linear pattern, which may be row-by-row, column-by-column, by diagonal lines, or some other alternating pattern of rows, columns, and/or diagonals. In such an example, the number of components (e.g., sensors) determining points of contact may be reduced while maintaining enough resolution to scan a fingerprint, In some embodiments, the control circuitry may be further configured to detect one or more points of contact of a palm of the user with a second subset of portions of the plurality of portions of the surface of the device. The control circuitry may be further configured to identify a second subset of MEMS components of the plurality of MEMS components that correspond to the second subset of portions of the surface of the device. The control circuitry may be further configured to cause the second subset of MEMS components to actuate based at least in part on detecting the one or more points of contact of the palm with the second subset of portions of the surface of the device. The control circuitry may be further configured to measure, using positions of the second subset of MEMS components, topography of the palm. The control circuitry may be further configured to detect a palmprint profile of the user based at least in part on the measured topography of the palm. The control circuitry may be further configured to determine whether the palmprint profile corresponds to a registered palmprint profile. To authenticate the user, the control circuitry may be further configured to determine that the palmprint profile corresponds to the registered palmprint profile. Such aspects enable using MEMS components to enable direct measurement of the ridges and valleys of a palmprint through raising or lowering the vertical positions of the MEMS components and provides additional security by virtue of allowing configurable combinations of fingers and palms for authentication.

In some approaches, the device may further comprise a plurality of sensors configured to provide signals used to detect the one or more points of contact of the finger of the user. The control circuitry may be further configured to detect the one or more points of contact of the finger with the subset of portions of the surface of the device by comparing a measurement derived from a signal from one or more of the plurality of sensors to a threshold and determining that the measurement is greater than the threshold. In some embodiments, the plurality of sensors comprise at least one of a touch sensor, a force sensor, a proximity sensor, a motion sensor, or a photoelectric sensor.

In some embodiments, the first subset of MEMS components are set to an initial height or position that enables depression of the MEMS components upon a finger contacting the subset of the plurality of portions of the surface of the device. The control circuitry may be further configured to determine whether the initial height or position of each of one or more MEMS components of the first subset of MEMS components has changed to a subsequent height; and use a binary representation corresponding to a) the initial height or b) the subsequent height for each of the first subset of MEMS components to generate a 2D mapping of the finger.

In some embodiments, the first subset of MEMS components are set to a position or height (e.g., minimum) prior to detecting contact with the surface of the device. The control circuitry may be further configured to cause the first subset of MEMS components to be raised with respect to the finger in contact with the subset of portions of the surface of the device by causing incremental actuation of each of the first subset of MEMS components to a second height corresponding with contact with the finger. The control circuitry may be further configured to use each second height of each of the first subset of MEMS components to measure topography of the finger. Such aspects enable using MEMS components to measure the ridges and valleys (e.g., topography) of friction ridge skin (e.g., a fingerprint, palmprint, or the like) through incrementally actuating (e.g., raising or lowering) the vertical positions (orthogonally to the surface of the device) of the MEMS components at one or more locations corresponding to the location of the contact with the surface of the device to determine a pattern of raised/unraised MEMS components that correspond to a fingerprint pattern.

In some embodiments, the device surface is a display comprising a plurality of display pixels.

In some embodiments, the control circuitry may be further configured to detect one or more points of contact of a second finger with a second subset of portions of the plurality of portions of the surface of the device, at substantially a same time as detecting the one or more points of contact of the first finger with the first subset of portions. The control circuitry may be further configured to identify a second subset of MEMS components of the plurality of MEMS components that correspond to the second subset of portions. The control circuitry may be further configured to cause the second subset of MEMS components to actuate based at least in part on detecting the one or more points of contact of the second finger with the second subset of portions of the surface of the device. The control circuitry may be further configured to measure, using positions of the second subset of MEMS components, topography of the second finger. The control circuitry may be further configured to detect a second fingerprint profile of the user further based at least in part on the measured topography of the second finger. The control circuitry may be further configured to determine whether the second fingerprint profile corresponds to a registered second fingerprint profile; and, to authenticate the user, the control circuitry is further configured to determine the detected second fingerprint profile corresponds to the registered second fingerprint profile. Such aspects enable using MEMS components to additionally read multiple fingerprints at any location on the surface of the device, e.g., where MEMS components are located, to increase the security of devices and systems by requiring two points of verification.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. The scope of the present invention is defined solely by the claims. It should be noted that for clarity and ease of illustration, these drawings are not necessarily made to scale.

FIG. 5A depicts a flowchart of a process for authenticating a user via a fingerprint profile, in accordance with some embodiments of this disclosure.

DETAILED DESCRIPTION

A friction ridge skin reader is provided herein. For example, a device with a surface comprising a plurality of MEMS components (e.g., actuators, sensors, or another suitable MEMS combination thereof) is provided that measures the ridges and valleys of a fingerprint. The measurement may be used, for example, for authentication to access the device and/or one or more resources provided by or to the device. The device with a surface (or another portion thereof) comprising a plurality of MEMS components may be further configured to detect the movement of a finger translating across the surface of the device and further authenticate access to the device based on the movement detected (e.g., two-factor authentication). The surface of the device may be another suitable surface, including the display of a device.

As referred to herein, the phrase "friction ridge skin" refers to the skin found on the palmar (e.g., hands) and plantar (e.g., feet) surfaces of the human body. Friction ridge skin is distinguished by a pattern of "ridges" and "valleys" corresponding to elevated lines of skin (e.g., often curved and/or looped) and the spaces between the elevated lines of skin, respectively. The patterns of ridges and valleys of friction ridge skin are unique to each individual. For example, the friction ridge skin of a finger forms a person's fingerprint. Ridges are the dark lines of a friction ridge skin print image. "Minutiae" are specific, minute details or characteristics of the ridge pattern (e.g., ridge ending, bifurcation, island, enclosure, short ridge, spur, bridge, crossover, delta, core, or the like). As referred to herein, the phrases "fingerprint profile" and "palmprint profile" refer to a specific ridge pattern and corresponding minutiae that, when compared, distinguish one person from another.

Figure 1A:
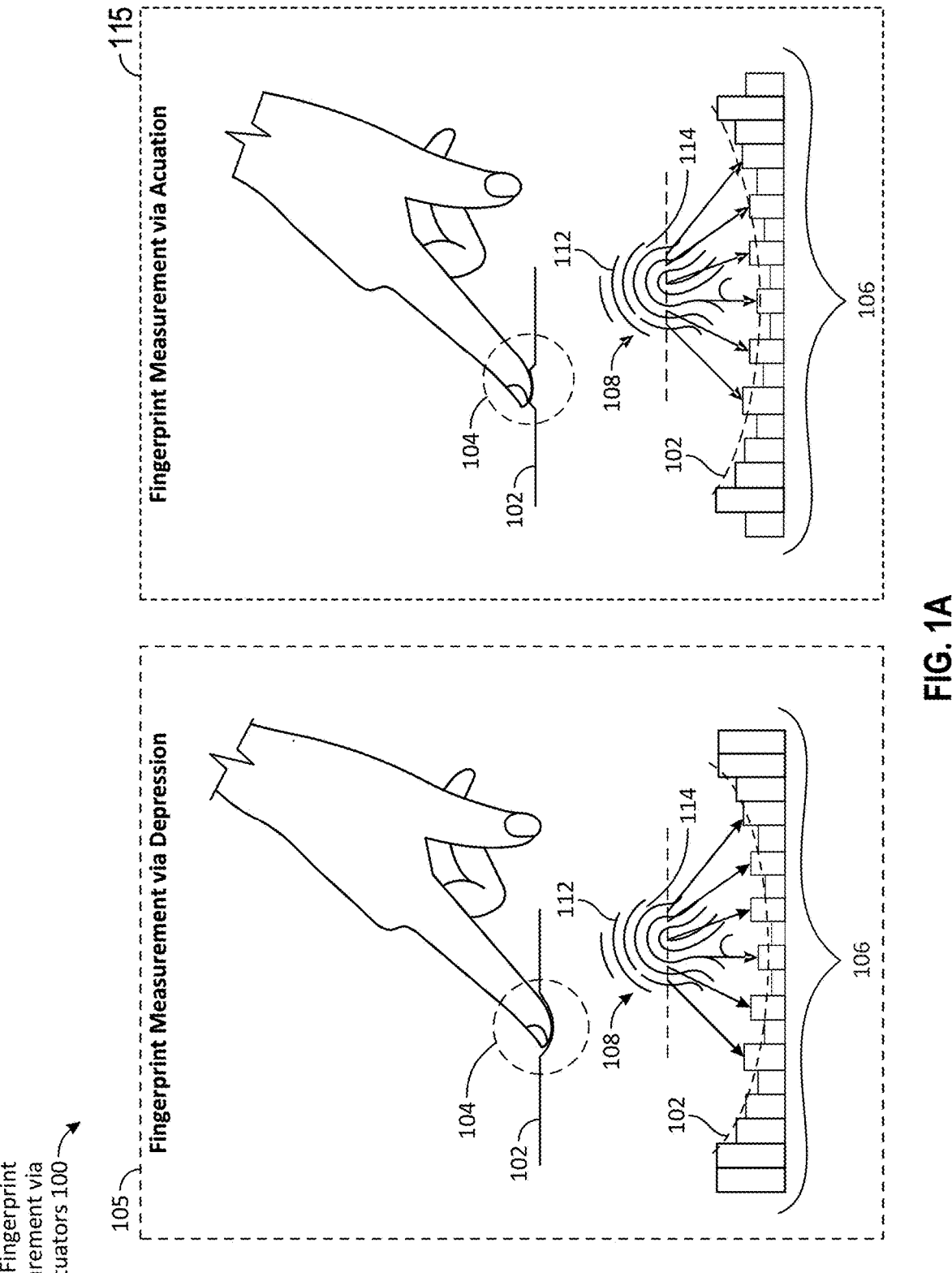
FIG. 1A depicts a schematic illustration of fingerprint measurement via MEMS actuators, in accordance with some embodiments of this disclosure.

FIG. 1A depicts a schematic illustration 100 of fingerprint measurement via MEMS actuators 106, in accordance with some embodiments of this disclosure. For example, MEMS actuators 106 may be used (e.g., in combination with control circuitry or other circuitry) to measure fingerprint 108 of a finger through the depression pattern of the MEMS actuators 106, shown in panel 105, or through the actuation height or position of the MEMS actuators 106, shown in panel 115. The MEMS actuators 106 may be disposed throughout the surface of the device to perform such fingerprint scanning/mapping at any location on the surface of a device, e.g., where MEMS components are located. In some embodiments, MEMS actuators 106 may be used in combination with a liveliness detection sensor (e.g., pulse sensor, temperature sensor) to ensure a real finger is being measured. It should be understood that schematic illustration 100 is not to scale and is simplified for understanding. For example, while schematic illustration 100 shows one MEMS actuator per ridge and valley, it is contemplated that there may be many MEMS actuators per ridge and valley. It is also contemplated that while the figures herein display specific example embodiments, such as fingerprints, other friction ridge skin may be measured using the methods described herein.

Figure 6:
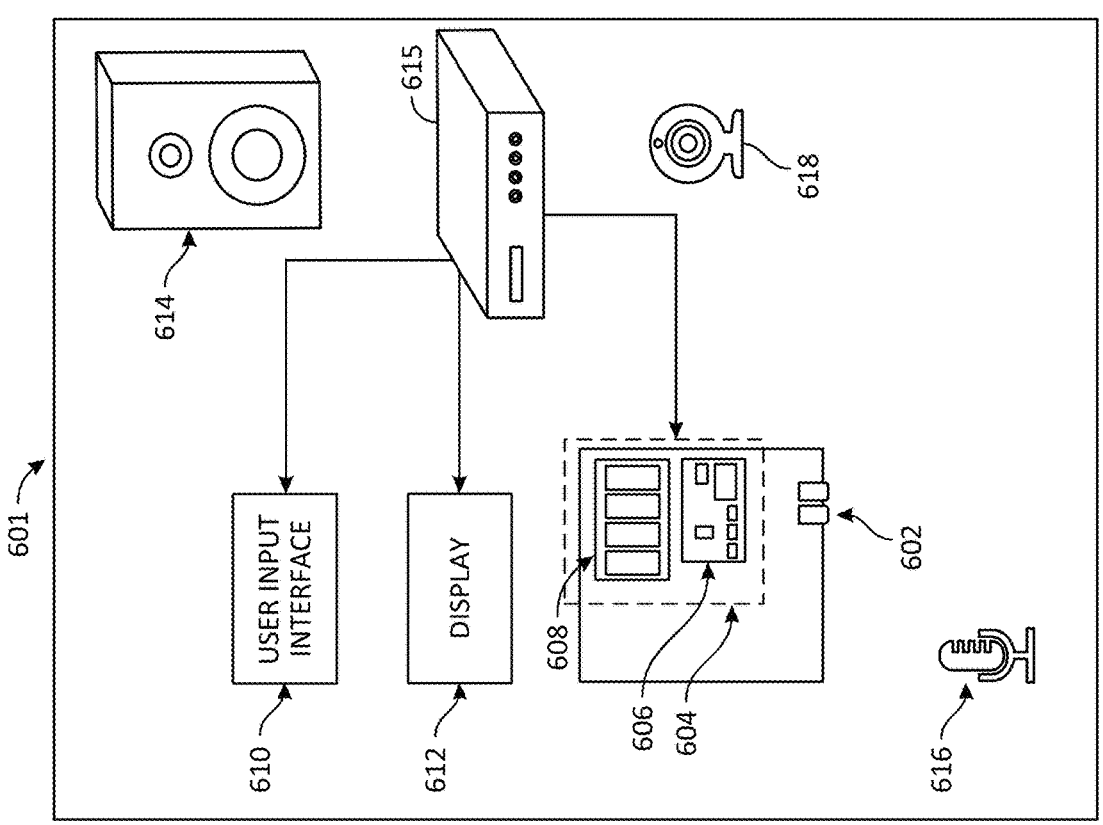
FIG. 6 depicts illustrative user equipment, in accordance with some embodiments of this disclosure.
Figure 6:
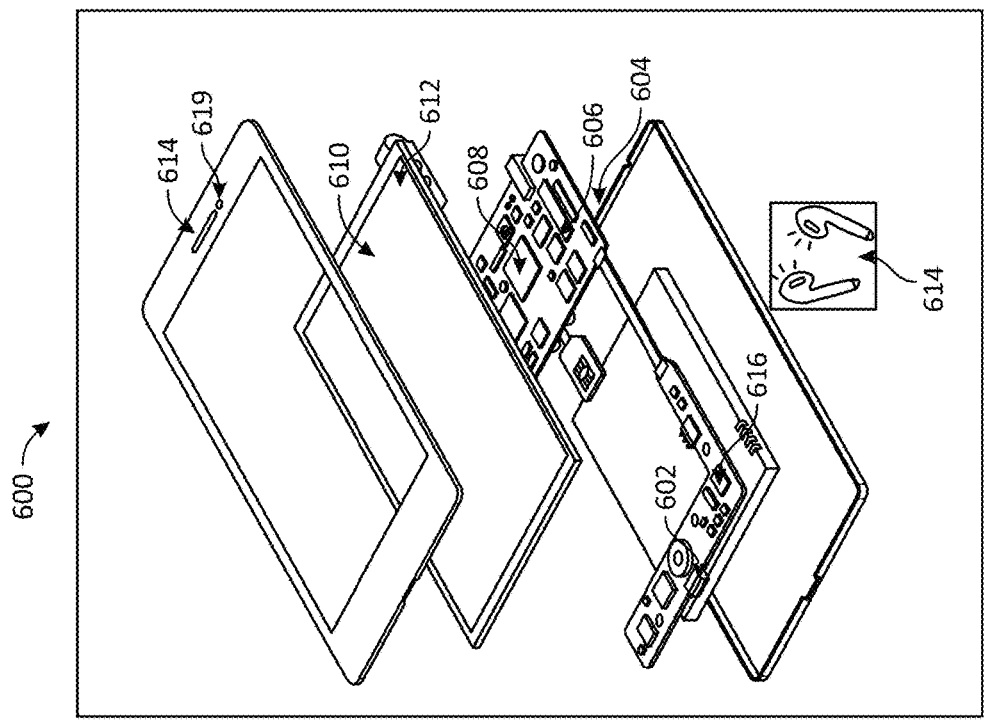
Figure 7:
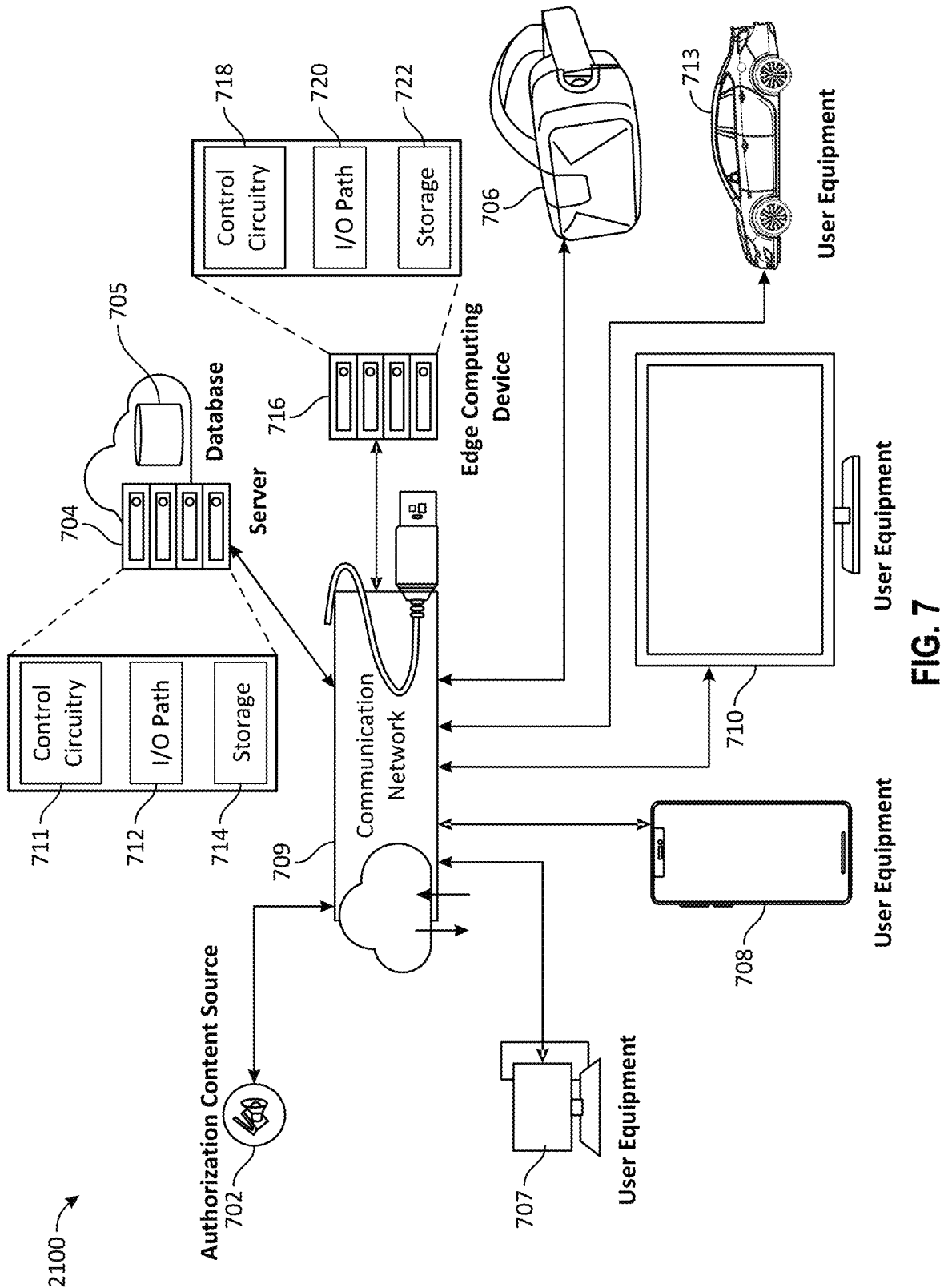
FIG. 7 depicts an illustrative user equipment system, in accordance with some embodiments of this disclosure.

In some embodiments, control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) of a device (e.g., display or other suitable surface of a device, for example another suitable surface of user equipment 706, 707, 708, 710, or 713 of FIG. 7) may detect one or more points of contact 104 on surface 102. For example, the control circuitry may detect a finger, friction ridge skin of a finger, or the like. For example, control circuitry may determine a finger is touching the surface 102 of the device by detecting a depression of one or more MEMS actuators, and/or by way of a touch sensor (e.g., piezoelectric sensor, capacitive sensor, resistive sensor, optical sensor, ultrasonic sensor, or the like), a force sensor, a proximity sensor, a motion sensor, a photoelectric sensor, a temperature sensor, and/or another suitable sensor or combination thereof. For example, the control circuitry may receive signals (e.g., corresponding to contact measurements) from a plurality of the aforementioned sensors. The control circuitry may compare the measurement, derived from the signals of the sensors, to a threshold and, if the measurement exceeds a threshold, determine that contact is being made at the location of the sensor In some embodiments, as shown in panel 105, MEMS actuators 106 are configured, by control circuitry, to be positioned at a height (e.g., maximum height, middle height, or another suitable height that permits depression), and may be depressed by the forces of the finger at the one or more points of contact 104 on surface 102 of the device. For example, MEMS actuators 106 may be depressed a greater vertical distance at ridge 112 of fingerprint 108 and MEMS actuators 106 may be depressed a lesser vertical distance at valley 114 of fingerprint 108, as illustrated by the arrows correlating the less displaced MEMS actuators 106 with the valleys of fingerprint 108. The greater displaced MEMS actuators 106 are correlated with the ridges of fingerprint 108. In some embodiments, control circuitry may also raise (e.g., in a direction generally orthogonal to the surface 102) MEMS actuators 106 in response to detecting the one or more points of contact 104 to refine measurements. For example, control circuitry may raise MEMS actuators 106 until each MEMS actuator touches an object or extends to maximum height to help ensure a valley or boundary is properly measured. Control circuitry may utilize the positions or heights of MEMS actuators 106 to determine a fingerprint profile through 3D and/or 2D fingerprint mapping as discussed in further detail in relation to FIG. 1B. Control circuitry may further compare the fingerprint profile to registered fingerprint profiles of the device (e.g., stored in storage circuitry 608 of FIG. 6, 714 of FIGS. 7, and 722 of FIG. 7) to provide access, verification, authorization, and/or security. In some embodiments, registered data (e.g., fingerprint profiles, palmprint profiles, movement profiles, or another suitable registration data, or combinations thereof) may be associated with a user profile, a display, a device, a platform, an application, or another suitable user identifiable entity, such that control circuitry may compare the fingerprint profile to a registered fingerprint profile.

In some embodiments, as shown in panel 105, MEMS actuators 106 are configured, by control circuitry, to be positioned at an initial height (e.g., maximum height, middle height, or another suitable height that permits depression), and may be depressed by the forces of the finger at the one or more points of contact 104 on surface 102 of the device. The control circuitry may determine whether the initial height of each of one or more MEMS components of the first subset of MEMS components has changed to a subsequent height and use a binary representation (e.g., 0, 1) corresponding to a) the initial height or b) the subsequent height for each of the MEMS actuators 106 to measure topography of the finger. For example, the control circuitry may generate a 2D mapping of the fingerprint where "0" measurements corresponds to a valley and "1" measurements correspond to a ridge.

In some embodiments, as shown in panel 115, control circuitry may configure MEMS actuators 106 to be positioned at a certain height (e.g., minimum height, middle height, or another suitable height that permits raising) and may raise MEMS actuators 106 to measure fingerprint 108. For example, control circuitry may raise MEMS actuators 106 based on determining one or more fingers are placed on surface 102 of the device. For example, the control circuitry may raise MEMS actuators 106 in the one or more locations where the one or more fingers are determined to be contacting surface 102. In another example, control circuitry may determine an area of MEMS actuators 106 to raise based on at least one point of contact of a finger with surface 102. In this example, the device would not need to sense contact at every MEMS actuator position. For example, control circuitry may determine a fingerprint profile area (e.g., an average fingerprint-sized area) generally centered about or around the determined one or more points of contact. The fingerprint profile area may contain MEMS actuators at which one or more points of contact has been detected and MEMS actuators adjacent to the detected points of contact within the boundaries of the determined fingerprint profile area. For example, the control circuitry may actuate MEMS actuators 106 in the fingerprint profile area. Control circuitry may actuate MEMS actuators 106 in a pattern, for example, actuating the MEMS actuators of the fingerprint profile area all at once, actuating the MEMS actuators of the fingerprint profile area in a sequence, actuating the MEMS actuators of the fingerprint profile area intermittently, actuating the MEMS actuators of the fingerprint profile area in a wave pattern, actuating the MEMS components in a ring pattern, actuating the MEMS actuators of the fingerprint profile area in a row pattern, actuating the MEMS actuators of the fingerprint profile area in a columnar pattern, or actuating the MEMS actuators of the fingerprint profile area in a diagonal pattern. In some embodiments, control circuitry may actuate MEMS actuators 106 in a linear pattern, which may be row-by-row, column-by-column, by diagonal lines, or some other alternating pattern of rows, columns, and/or diagonals. In some embodiments, the control circuitry may actuate select MEMS actuators (e.g., a subsample of MEMS actuators within the area of contact). For example, if the pixel pitches are much smaller than the width of the valleys and ridges of a fingerprint, actuating every nth MEMS actuator may provide enough resolution to determine the topography of the fingerprint. In another example, control circuitry may cause one or more configurable locations of surface 102 to raise MEMS actuators 106 and may cause MEMS actuators 106 to be raised in those locations based on a triggering event (e.g., request for access, verification, authorization, and/or security).

For example, the pseudocode below is contemplated as an example for controlling the MEMS actuators 106 to measure fingerprint 108.

```
set actuator to height;
do
    raise actuator one step;
    if (actuator touches an object)
        break;
while (actuator height<max height)
send actuator height;
```

In this example, control circuitry may determine that a MEMS actuator has touched an object if the MEMS actuator cannot rise and is not at maximum height, or through a touch sensor (e.g., piezoelectric sensor, capacitive sensor, resistive sensor, optical sensor, ultrasonic sensor, or the like), a force sensor, a proximity sensor, a motion sensor, a photoelectric sensor, a temperature sensor, and/or another suitable sensor or combination thereof configured with the MEMS actuator. For example, the control circuitry may receive signals (e.g., corresponding to contact measurements) from a plurality of the aforementioned sensors. The control circuitry may compare the measurement, derived from the signals of the sensors, to a threshold and, if the measurement exceeds a threshold, determine that contact is being made at the location of the sensor. The more extended MEMS actuators 106 are correlated with the valleys of fingerprint 108, and the less extended MEMS actuators 106 are correlated with the ridges of fingerprint 108. Control circuitry receiving the sent actuator heights or height data may generate a map or other characterization of the surface with the resolution of activated MEMS actuators 106 positioned in a matrix, as discussed in further detail in relation to FIG. 1B. Control circuitry may further compare the fingerprint profile to registered fingerprint profiles of the device (e.g., stored in storage circuitry 608 of FIG. 6, 714 of FIGS. 7, and 722 of FIG. 7) to provide access, verification, authorization, and/or security. In some embodiments, registered data (e.g., fingerprint profiles, palmprint profiles, movement profiles, or another suitable registration data, or combinations thereof) may be associated with a user profile, a display, a device, a platform, an application, or another suitable user identifiable entity, such that control circuitry may compare the fingerprint profile to a registered fingerprint profile.

Figure 1B:
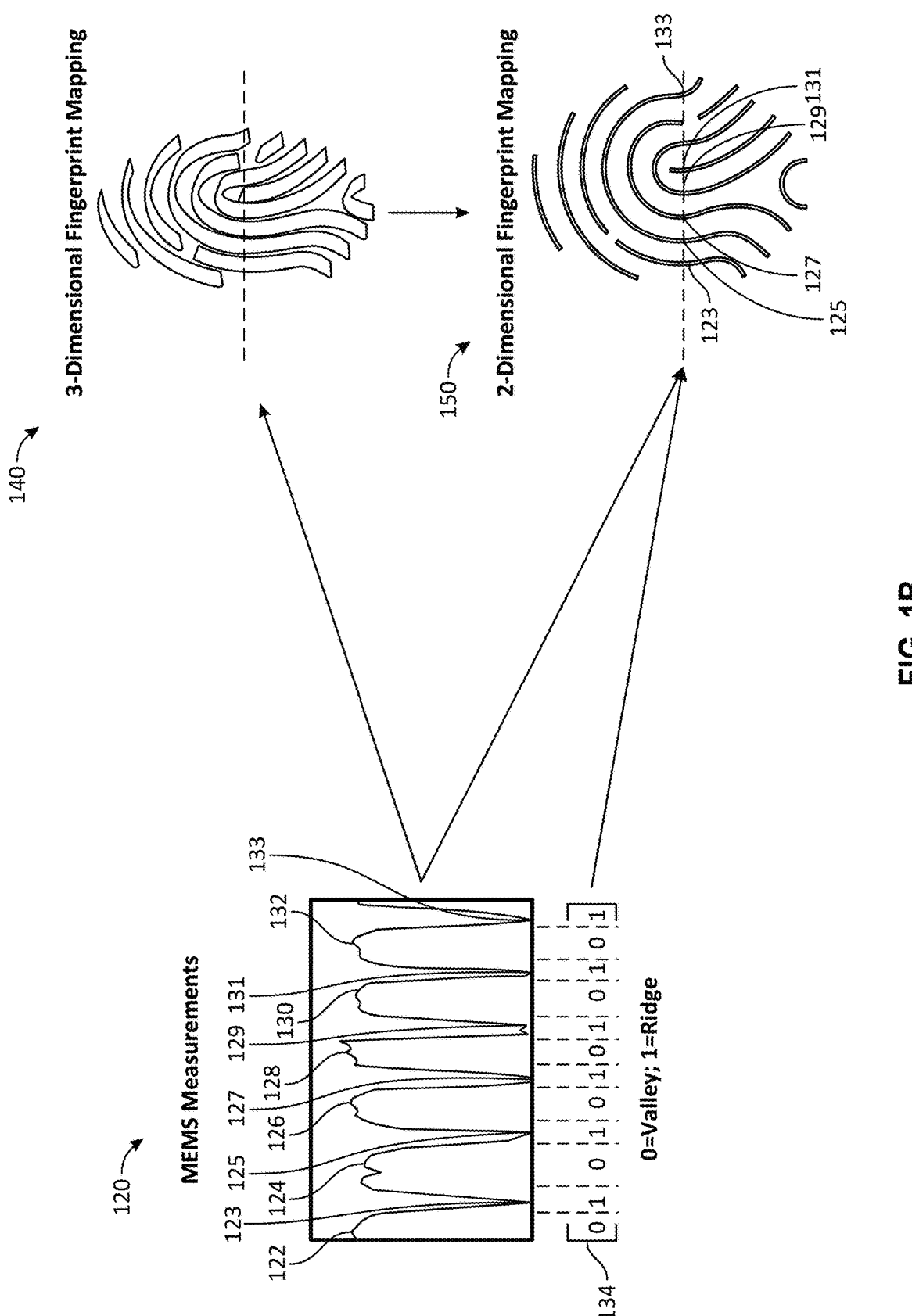
FIG. 1B depicts a schematic illustration of fingerprint mapping, in accordance with some embodiments of this disclosure.

FIG. 1B depicts a schematic illustration of fingerprint mapping, in accordance with some embodiments of this disclosure. In some embodiments, the MEMS measurements 120 are the heights or positions of each of the MEMS actuators 106 of FIG. 1A and may be used to determine a fingerprint profile. For example, the heights of the MEMS actuators may be used directly to generate 3D fingerprint mapping 140 by mapping the measured heights across the area of MEMS actuators 106 of FIG. 1. 3D fingerprint mapping 140 may be used to generate 2D fingerprint mapping 150. For example, 3D fingerprint mapping 140 may be flattened by projecting the 3D mapping onto a 2D plane, slicing the 3D fingerprint mapping 140 at a threshold height (e.g., between 30 μm-60 μm, or another suitable height that permits distinction between a ridge and a valley) to produce a 2D-slice view, creating a 2D depth map, or by another suitable method, or combination thereof.

In another example, the heights of the MEMS actuators may be used directly to generate 2D fingerprint mapping 150 by mapping measured heights with respect to a threshold (e.g., between 30 μm-60 μm, or another suitable height that permits distinction between a ridge and a valley) across the area of MEMS actuators. For example, MEMS actuators at a height greater than 50 μm (e.g., heights 122, 124, 126, 128, 130, and 132) would be mapped as a valley, and MEMS actuators at a height less than 50 μm (e.g., heights 123, 125, 127, 129, 131, and 133) would be mapped as a ridge. In some embodiments, 2D fingerprint mapping 150 may be generated from binary representation 134 without the need for a direct measurement value for each MEMS actuator height. For example, using a threshold, control circuitry of the device may assign 0s for measurements above the height threshold measurement to represent valleys and 1s for measurements below the height threshold measurement to represent ridges. The threshold may be configure to be an absolute height relative to the MEMS actuator height range or may configured to be relative to the range of depression heights during contact with the surface 102 of FIGS. 1A and 1C. The control circuitry may map the assigned binary values according to the MEMS actuator locations to generate 2D fingerprint mapping 150.

In some embodiments, adaptive thresholding for MEMS actuator heights or positions may be used to generate 2D fingerprint mapping 150 and 3D fingerprint mapping 140. As shown in FIG. 1A, the finger making contact with surface 102 has a curvature, thus the MEMS actuator heights of the ridges and valleys will vary according to the curvature of the finger. For example, MEMS actuators located near the edges of the finger contact that have heights that correspond to a ridge may be as high (e.g., in absolute height) as MEMS actuators in the center of the finger contact that have heights that correspond to a valley. In some embodiments, the adaptive thresholding may comprise determining a pattern of higher and lower extended MEMS actuators relative to the area of MEMS actuators to determine which heights represent ridges or valleys to generate an accurate representation of the fingerprint. In some embodiments, the adaptive thresholding may apply predetermined adjustments to the measured absolute heights based on average curvature of a finger to account for the curvature of the finger.

Figure 1C:
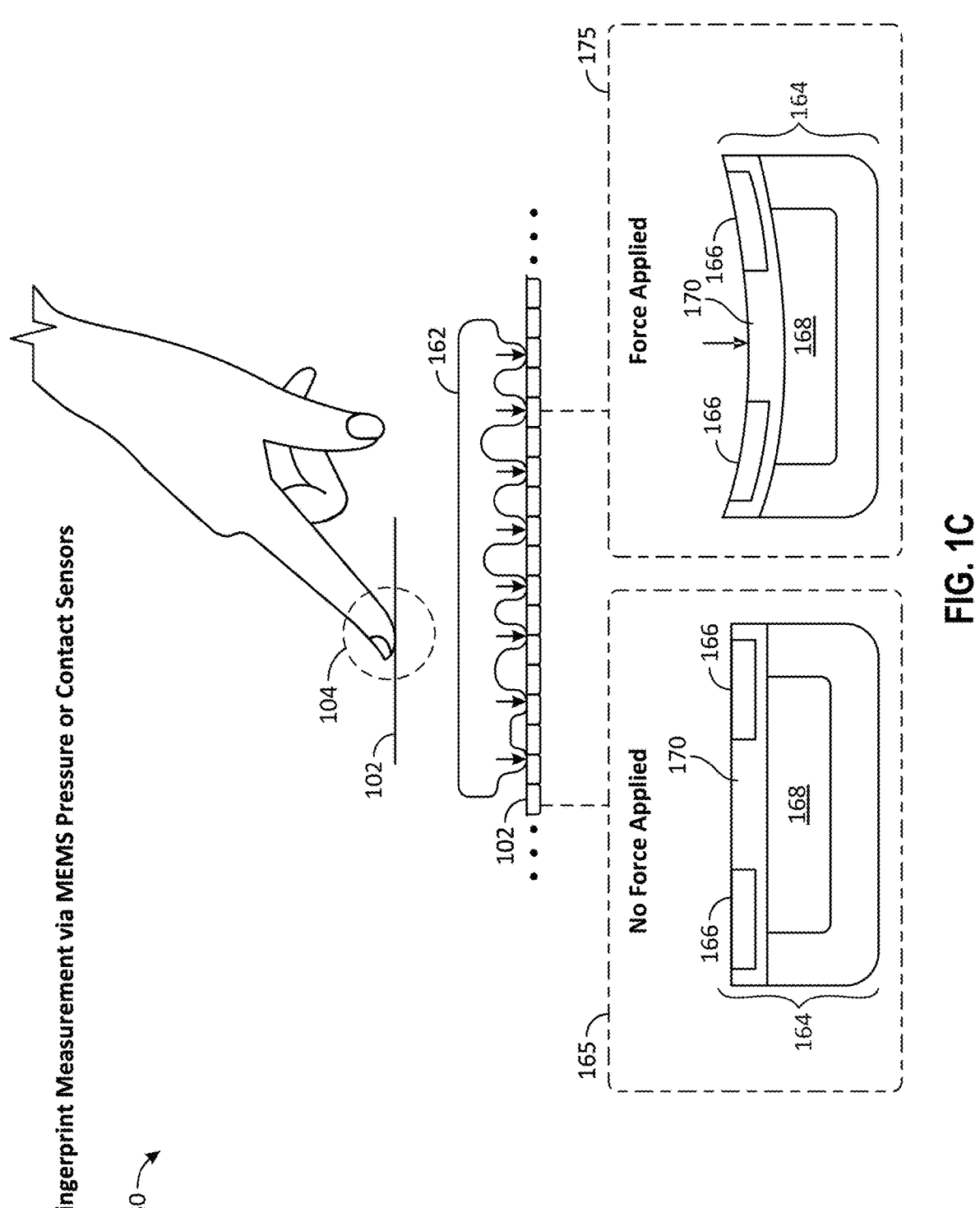
FIG. 1C depicts a schematic illustration of fingerprint measurement via MEMS pressure or contact sensors, in accordance with some embodiments of this disclosure.

FIG. 1C depicts a schematic illustration 160 of fingerprint measurement via MEMS pressure sensors 164, in accordance with some embodiments of this disclosure. For example, MEMS pressure sensors 164 comprise piezoresistors 166, cavity 168, and diaphragm 170. It should be understood that schematic illustration 160 is not to scale and is simplified for understanding. For example, while schematic illustration 160 shows one MEMS pressure sensor per ridge and valley, it is contemplated that there may be many MEMS pressure sensors per ridge and valley. It is also contemplated that while the figures herein display specific example embodiments, such as fingerprints, other friction ridge skin may be measured using the methods described herein.

In some embodiments, control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) of a device (e.g., a display or other suitable surface of a device, for example another suitable surface of user equipment 706, 707, 708, 710, or 713 of FIG. 7) may use MEMS pressure sensors 164 to detect one or more points of contact 104 on surface 102. For example, the ridges of fingerprint 162 are making contact with surface 102. MEMS pressure sensors 164 disposed under surface 102 may measure pressure at each of the piezoresistors 166 during application of force on diaphragm 170, as shown in panel 175. For example, MEMS pressure sensors 164 may measure a greater force at the ridges of fingerprint 162 and a lesser force at the valleys of fingerprint 162. Control circuitry may utilize the pressure measurements of MEMS pressure sensors 164 to determine a fingerprint profile through fingerprint mapping as discussed in further detail in FIG. 1D. Control circuitry may further compare the fingerprint profile to registered fingerprint profiles of the device (e.g., stored in storage circuitry 608 of FIG. 6, 714 of FIGS. 7, and 722 of FIG. 7) to provide access, verification, authorization, and/or security. In some embodiments, registered data (e.g., fingerprint profiles, palmprint profiles, movement profiles, or another suitable registration data, or combinations thereof) may be associated with a user profile, a display, a device, a platform, an application, or another suitable user identifiable entity, such that control circuitry may compare the fingerprint profile to a registered fingerprint profile.

In some embodiments, a device may comprise MEMS actuators (e.g., MEMS actuators 106 of FIG. 1A) and MEMS pressure sensors 164 to measure a fingerprint. For example, control circuitry may determine the location of contact for a fingerprint scan using MEMS pressure sensors 164 on the surface of the device. Based on the location of contact, the control circuitry may actuate (e.g., raise or lower) the MEMS actuators. In some embodiments, the MEMS pressure sensors 164 (or another suitable touch sensor) may be disposed above the MEMS actuators such that MEMS pressure sensors 164 may determine pressures at the corresponding MEMS actuators. For example, MEMS pressure sensors 164 may be represented by subpixel 212 in FIG. 2. The control circuitry may determine (e.g., by exceeding a pressure threshold) from the MEMS pressure sensors that the corresponding MEMS actuators has made contact with the finger and stop actuating the MEMS actuators. Once the control circuitry determines that all MEMS actuators have been stopped, the heights of all the MEMS actuators at the location of contact are used to determine a finger print profile (e.g., 3D fingerprint profile 140 and 2D fingerprint profile 150 of FIG. 1B.

Figure 1D:
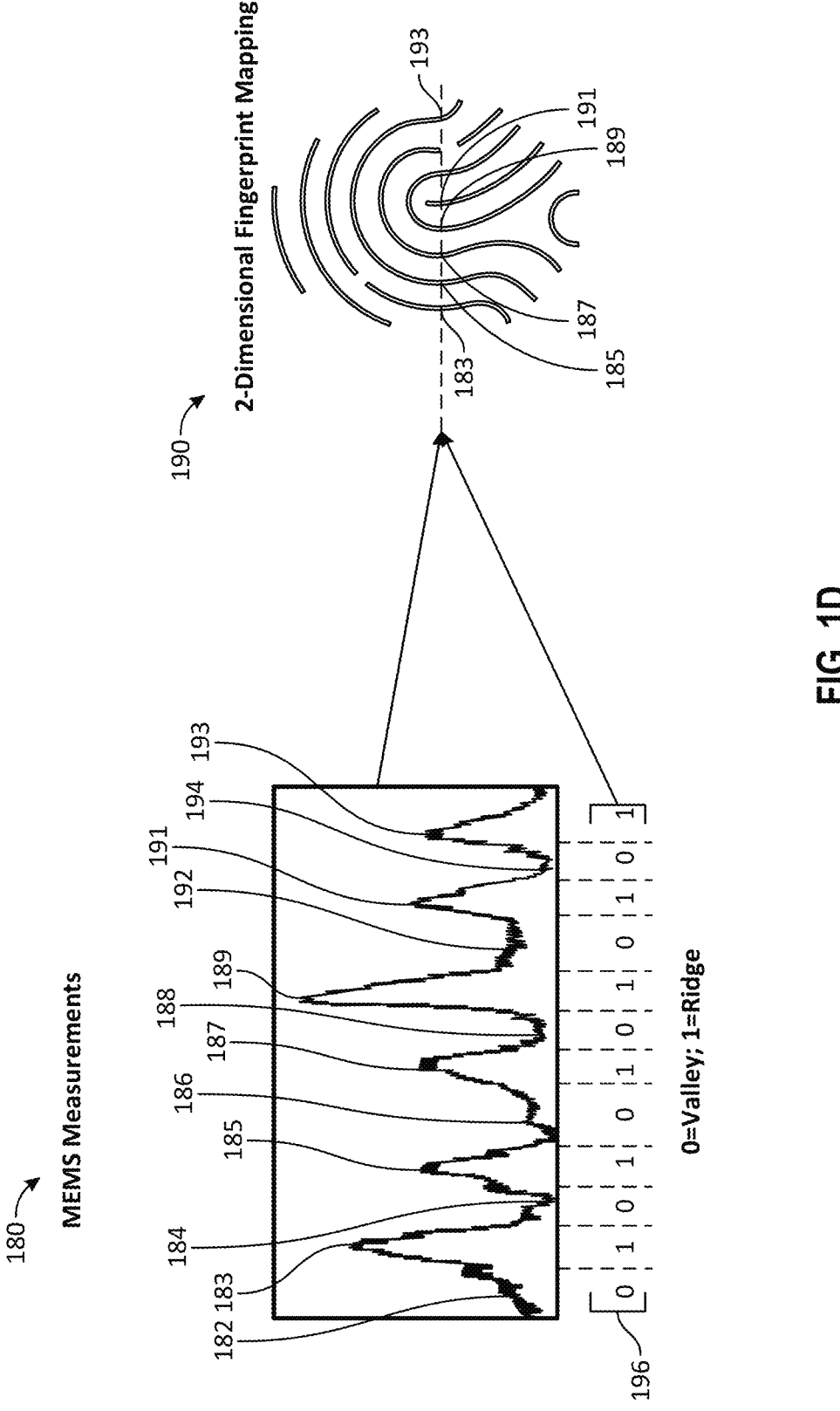
FIG. 1D depicts a schematic illustration of fingerprint mapping, in accordance with some embodiments of this disclosure.

FIG. 1D depicts a schematic illustration of fingerprint mapping, in accordance with some embodiments of this disclosure. In some embodiments, the MEMS measurements 180 of FIG. 1D are the pressure measurements made by each of the MEMS pressure sensors 164 of FIG. 1C and may be used to determine a fingerprint profile. For example, the pressure measurements of the MEMS pressure sensors may be used to generate 2D fingerprint mapping 190 by mapping measured pressures with respect to a threshold (e.g., between 2-13 kPa, or another suitable pressure that permits distinction between a ridge and a valley) across the area of MEMS pressure sensors. For example, MEMS pressure sensors at a pressure less than 2 kPa (e.g., pressures 182, 184, 186, 188, 192, and 194), or another configured value, would be mapped as valleys, and MEMS actuators at a pressure greater than 2 kPa (e.g., pressures 183, 185, 187, 189, 191, and 193), or another configured value, would be mapped as ridges. In some embodiments, 2D fingerprint mapping 190 may be generated from a representation 196 (e.g., a binary representation) without the need for a direct measurement value from each MEMS pressure sensor. For example, using a threshold, control circuitry of the device may assign 0s for measurements below the pressure threshold measurement to represent valleys and 1s for measurements above the pressure threshold measurement to represent ridges. The control circuitry may map the assigned binary values according to the MEMS pressure sensor locations to generate 2D fingerprint mapping 190.

Figure 2:
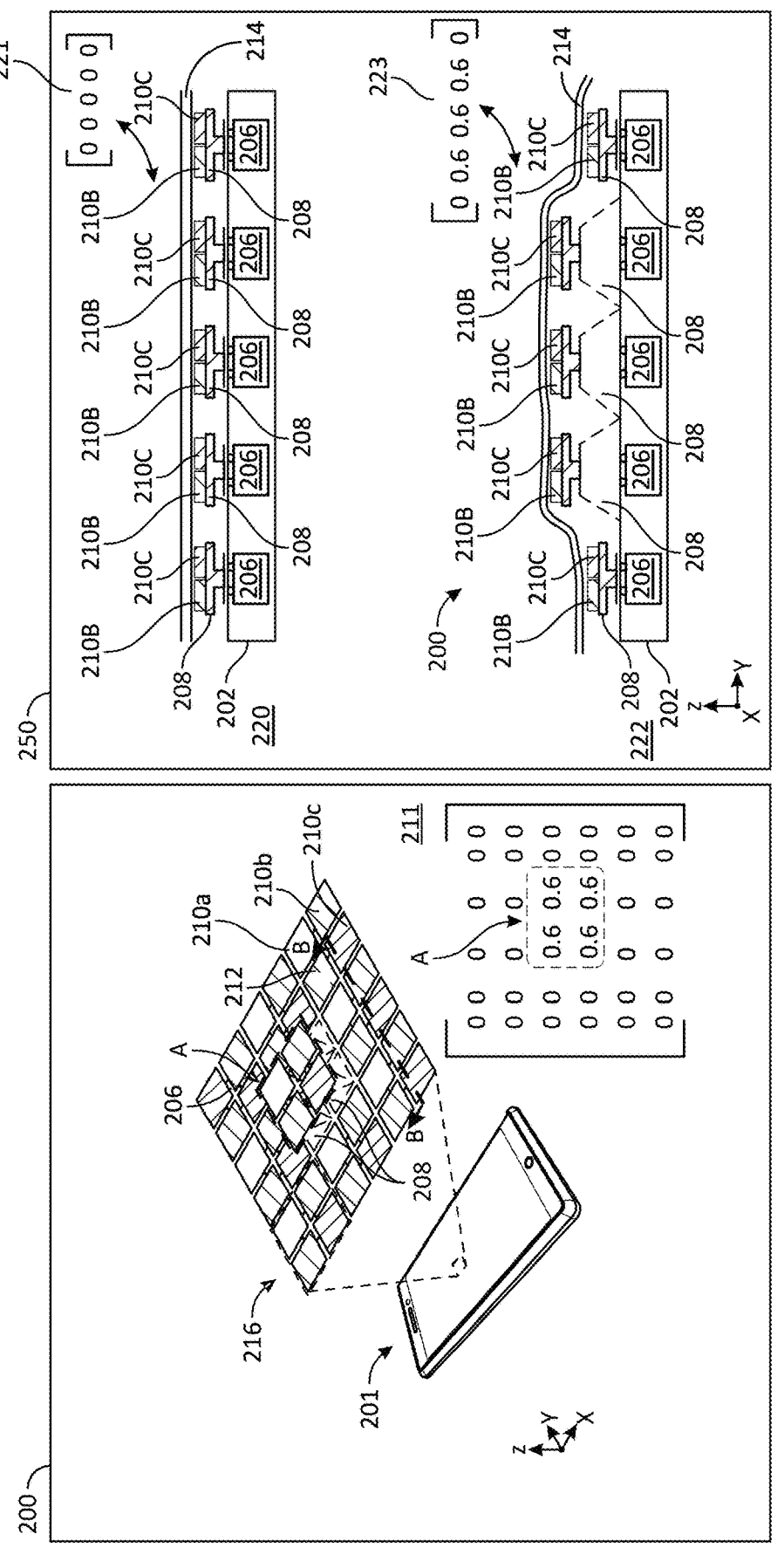
FIG. 2 depicts a schematic illustration of example views of a display device, in accordance with some embodiments of this disclosure.
Figure 3:
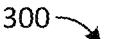
FIG. 3 depicts a schematic illustration of gesture recognition, in accordance with some embodiments of this disclosure.
Figure 3:
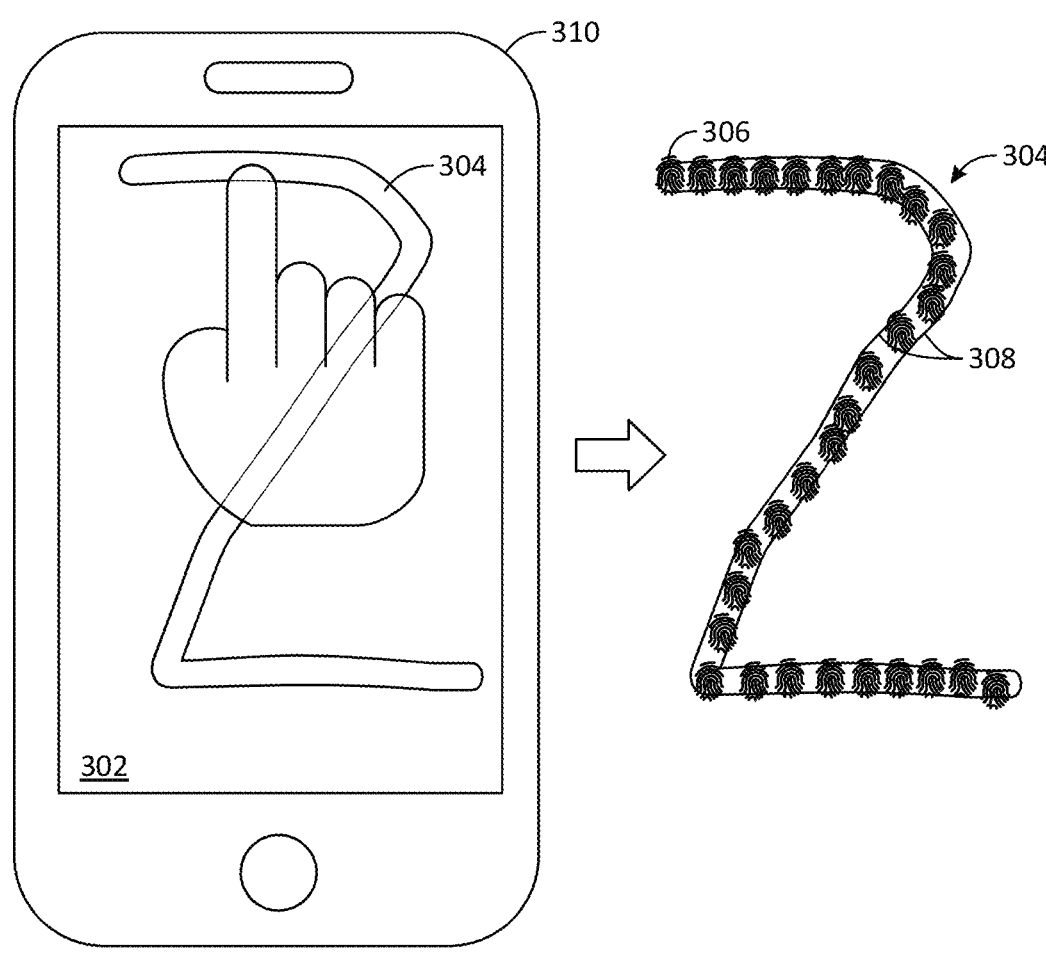

FIGS. 2 and 3 schematically illustrate various embodiments of a display. In some embodiments, the display (e.g., display 201, display 302, or another suitable display) includes MEMS actuators 208 beneath pixels. In some embodiments, pixels are not included at each MEMS actuator, for example, pixels may not be necessary for fingerprint scanning devices for some scenarios involving security checks, automobile access, workforce management, and banking, or where MEMS actuators for fingerprint scanning are located on surfaces other than a display. Control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) may raise or lower MEMS actuators to measure friction ridge skin contacting the surface of the display. In some embodiments, each pixel may correspond to a MEMS actuator, or a single MEMS actuator may be provided in relation to multiple pixels.

In some embodiments, the display may be a microLED display and comprise microLEDs (e.g., a microLED stack), with sizes equal to or less than about 100 μm, 50 μm, or 5 μm. In some embodiments, the MEMS actuators or microLEDs may further be configured with touch sensors (e.g., piezoelectric sensor, capacitive sensor, resistive sensor, optical sensor, ultrasonic sensor, or the like). Control circuitry of the display may use the touch sensors to determine that a finger is touching the display or surface and, in response, actuate MEMS actuators 208 to rise at the determined location of the finger contact until each of the MEMS actuators contacts (e.g., using the information from the touch sensors) a surface of the finger (e.g., ridge or valley). In some embodiments, a group of microLEDs are arranged in a matrix and fixed to a single MEMS actuator. In an example, the display (e.g., display 201, display 302, or another suitable display) may comprise a plurality of 20×20 matrices of microLEDs with a gap of 5 μm fixed to a single MEMS actuator with a size of 100×100 μm, thus providing a pixel density of 512 pixels per inch.

In some embodiments, the display (e.g., display 201, display 302, or another suitable display) may be an LED display and comprise LEDs greater than about 500 μm in size or greater than about 100 μm in size. In some embodiments, the methods, systems, and apparatus (e.g., display) described throughout the present disclosure may be applied to another suitable application, such as, for example photo emissive applications (e.g., LED displays, laser arrays, vertical-external-cavity surface-emitting laser (VECSEL) arrays, etc.), photo sensitive applications (e.g., visible imager, short-wave infrared (SWIR) imager, near-infrared (NIR) imager, ultraviolet (UV) imager, etc.), or a combination thereof (e.g., light emitting and/or photo detection application, optical communications application, etc.).

A display may comprise one or more pixels or a plurality of pixels, such that, for example, the distribution of pixels provides sufficient resolution for the intended output (e.g., binary, text, image, video, or the like) of the display. Although a display illustrated in the figures may show a particular number of pixels (e.g., one, three, nine, 64, etc.), in some embodiments, the display may comprise, e.g., hundreds, thousands, millions, 1 megapixel (MP, one million pixels), 4MP, 8MP, 50MP, 100MP, and/or another suitable number of pixels. Although a display illustrated in the figures may show a specific arrangement of pixels and/or subpixels (e.g., arranged in an XY grid or array), in some embodiments, the display may comprise, e.g., pixels and/or subpixels arranged in a stripe, diamond, triad, pentile, and/or another suitable arrangement of pixels and/or subpixels.

A pixel may comprise one or more subpixels of suitable shape and color (e.g., one, two, three or more subpixels or LEDs) to output sufficient resolution for the intended output (e.g., binary, text, image, video, or the like) of the display. Although a pixel (e.g., pixel 216, or another suitable pixel) may show a specific number of subpixels (e.g., two, three, four), in some embodiments, the pixel may have another suitable number of subpixels or LEDs (e.g., one, two, four, five or more, etc.). Although the subpixels or LEDs are shown as similarly shaped rectangles, in some embodiments the subpixels or LEDs may be of another suitable shape (e.g., triangular, diamond-shaped, circular, elliptical, square, hexagonal, or another suitable shape). In certain embodiments, advancements in color conversion layers (e.g., colored phosphors, quantum dot layers, etc.) may permit the addition of a fourth color, like a green variant or cyan, to enhance the color gamut. In some embodiments, a pixel may comprise three subpixels (e.g., red subpixel, blue subpixel, and green subpixel). In some embodiments, a pixel may comprise four subpixels comprising a red LED, a blue LED, and two green LEDs. In some embodiments, LEDs of a pixel may also be electronically connected to a control device (e.g., IC drivers 206, readout integrated circuits (RIC), etc.).

FIG. 2 depicts a schematic illustration of example views of a display device, in accordance with some embodiments of this disclosure. Panel 200 shows display 201 (e.g., display device, micro-LED display) comprising a plurality of pixels 216, a plurality of subpixels (e.g., 210*a*, 210*b*, 210*c*, and 212), MEMS actuators 208, and integrated circuit (IC) drivers 206 disposed beneath pixels 216. Depicted adjacent to display 201, a matrix 211 illustrates an exemplary means of controlling the height of each of the MEMS actuators 208. For example, an array of 6×6 subpixels are depicted on the display 201, and each subpixel (e.g., 210*a*, 210*b*, 210*c*, and 212) corresponds to a value on 6×6 matrix 211. Each value on matrix 211 may start at 0 (e.g., non-actuated). For example, a pixel 216 may be actuated by 0.6 (e.g., 60% actuation), as shown outlined by dotted line A. Although matrix 211 depicts values as 0.6, another suitable value (e.g., 0.05, 0.43, 1.0, or another suitable value) corresponding to MEMS actuation may be used. For example, matrix values may be stroke length values (e.g., total height extension in μm), and matrix 211 may start at, or be configured to be set to, another suitable position or height (e.g., for a stroke of 100 μm the height may be a value in the range 0-100 μm). Continuing the example, the matrix 211 may correspond (e.g., be programmed into) to a driver (e.g., IC driver 206 or another suitable driver type) and cause corresponding pixels 216 and/or subpixels (e.g., 210*a*, 210*b*, 210*c*, and 212) to actuate, in a direction orthogonal to the display surface. In some embodiments, MEMS actuators 208 are actuated in response to, and at the location of, a finger contacting display 201. In some embodiments, a subset of MEMS actuators 208 may form a button or another suitable 3D shape (e.g., oval, square, etc.) for fingerprint reading.

In some embodiments, the MEMS actuator 208 may be another suitable type of actuator. Some examples include piezoelectric actuators, thermal actuators, and magnetic actuators. Although FIG. 2 depicts a group of subpixels (e.g., 210*a*, 210*b*, 210*c*, and 212) on a MEMS actuator 208, each subpixel (e.g., 210*a*, 210*b*, 210*c*, and 212) may be disposed on a separate, independently drivable MEMS actuator 208. In some embodiments, MEMS actuators 208 may have a vertical stroke designed to measure the depth of a fingerprint valley (e.g., 90-120 μm). In some embodiments, MEMS actuators 208 may be positioned in a matrix along the surface of display 201 with a distance between MEMS actuators 208 sufficient to probe and distinguish the ridges and valleys of the fingerprint (e.g., 100 micrometers or less). In some embodiments, MEMS actuators 208 of display 210 may be positioned throughout the entire surface of display 210. In some embodiments, MEMS actuators 208 of display 210 may be positioned in select areas of display 210. For example, display 210 may be configured with one or more particular areas for fingerprint reading. In some embodiments, for example, in portions of the display where a user is not likely to touch, or areas where there may be accidental or frequent contact (e.g., addressing a concern for wear of the MEMS actuators), display 210 may have areas without MEMS actuators 208.

Panel 250 schematically illustrates a view of the display 201 taken from the cross section of dotted line B of panel 200. Step 220 depicts display 201 in a non-actuated state, and step 222 depicts display 201 in an actuated state. The display 201 comprises a substrate 202, the substrate further comprising singulated IC drivers configured to drive any of the LEDs (e.g., 210*a*, 210*b*, 210*c*), the sensor 212, and/or MEMS actuator 208. Disposed on the substrate 202, the MEMS actuators 208 are mechanically and electrically coupled to the drivers 206 of the substrate 202. Disposed on the MEMS actuators 208 are one or more subpixels (e.g., 210*a*, 210*b*, 210*c*, and 212), and disposed over the subpixels of the MEMS actuator 208 is a stretchable transparent layer 214 (e.g., membrane) to provide adequate protection from the elements (e.g., dust, humidity, oils, or another environmental contaminant) to the stack. In some embodiments, subpixels may be vertically stacked on MEMS actuator 208.

In some embodiments, the substrate 202 may be an active-matrix backplane with micro driver ICs. In some embodiments, the substrate 202 may comprise either a dielectric and/or oxide (e.g., silicon or glass) or another suitable material to support IC drivers. In some embodiments, the substrate 202 may be or may comprise complementary metal-oxide-semiconductor (CMOS) circuitry. In some embodiments, the substrate may comprise bipolar CMOS (BICMOS) processors. In some embodiments, the substrate 202 may comprise a plurality of drivers for each drivable element of display 201. For example, although FIG. 2 depicts a single driver 206 per each drivable element disposed in substrate 202, the driver 206 may be representative of a plurality of drivers and/or driver types per each drivable element (e.g., MEMS actuator 208, subpixels 210*a*, 210*b*, 210*c* and 212).

In some embodiments, for example, a color display (e.g., RGB display), the subpixels (e.g., 210*a*, 210*b*, and 210*c*) may comprise active material that produces light different from one another (e.g., different range of wavelengths). For example, the first subpixel 210*a* of the display 201 may comprise an active material that produces red light, and some examples of these active layers include aluminum gallium arsenide (AlGaAs), aluminum gallium indium phosphide (AlGaInP), gallium arsenide phosphide (GaAP), gallium phosphide (GaP) or another suitable material used to generate red light. The second subpixel 210*b* of the display 201 may comprise an active material that produces green light, and some examples of these active layers include aluminium gallium indium phosphide (AlGaInP), aluminium gallium phosphide (AlGaP), indium gallium nitride (InGaN), gallium phosphide (GaP), or another suitable material used generate green light. The third subpixel 210*c* of the display 201 may comprise an active material that produces blue light, and some examples of these active layers may include indium gallium nitride (InGaN) or another suitable material used to generate blue light. In some embodiments, an active layer may comprise a phosphor.

In some embodiments, subpixel 212 may comprise any active material that emits light and may therefore function as an LED. In some embodiments, subpixel 212 may be a sensor. Some examples of sensor types may include LiDAR sensors, pressure sensors, light sensors, temperature sensors, piezoelectric sensor, capacitive sensor, resistive sensor, optical sensor, ultrasonic sensor or another suitable sensor type.

In some embodiments, the display 201 comprises a stretchable transparent layer 214. Some examples include silicon-based polymers (e.g., polydimethylsiloxane (PDMS)). In some embodiments, the stretchable transparent layer 214 comprises; polyurethane (PU), ionic gels, graphene-based composites, PEDOT: PSS (poly (3,4-ethylenedioxythiophene) polystyrene sulfonate), hydrogels (e.g., dopped hydrogels) or another suitable material or combination thereof.

As shown in FIG. 2, adjacent to each cross-section of display 201 is a corresponding controller matrix (e.g., matrix 221, and matrix 223). The controller matrices depict the actuation levels of each pixel 216. In some embodiments, the controller matrix (e.g., matrix 221, and matrix 223) may be a programmable element in the driver (e.g., IC driver 206). The driver may be, for example, STM32, Arduino, TI C2000, FPGA, ESP32 and/or another suitable controller for MEMS actuation. At step 220, matrix 221 is depicted to be at null state (e.g., each value=0). At step 222, matrix 223 depicts three centrally located pixels 216 to be actuated by 0.6 (e.g., 60% actuation). Although the controller matrix depicts values of 0.6, another suitable value to control percentage actuation may be used (e.g., 0.1, 0.15, 0.9, and/or 1). In some embodiments, the controller matrix depicts values as stroke length values (e.g., 0-100 micrometers). Depicted at step 222, the stretchable transparent layer 214 stretches with the MEMS actuator 208 and returns to null state (e.g., at step 220).

FIG. 3 depicts a schematic illustration 300 of gesture recognition, in accordance with some embodiments of this disclosure. As shown in FIG. 3, in some embodiments, a combination of fingerprint reading and gesture recognition may be employed, e.g., in one pass, to provide enhanced security in the form of 2FA.

In some embodiments, control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) of a display (or another suitable surface of a device, for example another suitable surface of user equipment 706, 707, 708, 710, or 713 of FIG. 7) may perform both fingerprint recognition and gesture recognition individually or as a single action, thus providing a two-factor authentication process (e.g., combining biometric fingerprint with knowledge of a registered gesture). For example, control circuitry of surface 302 of device 310 may detect and track movement 304 of a finger using the edges or borders where MEMS actuators are depressed as a user swipes across surface 302 and may correlate the detected deformation edges 308 with a registered gesture or movement to authenticate the user. In some embodiments, the control circuitry may also detect a fingerprint profile 306 between the detected deformation edges 308 in snapshot intervals throughout the movement 304.

In some embodiments, as an example, control circuitry of device 310 may execute the following pseudocode to enable the control of the MEMS actuators (e.g., MEMS actuators 106 of FIG. 1A, MEMS actuators 208 of FIG. 2, or the like) to measure gesture 304 while a finger is in motion.

```
set actuator height;
while (in reading mode)
    if (actuator senses touch or pressure)
        set flag as positive;
    else
        set flag as negative;
    capture snapshot of flags;
    wait for an interval;
turn off actuator;
```

In this example, control circuitry may set, actuate, or otherwise position MEMS actuators 106 of FIG. 1A to a height (e.g., maximum height, middle height, or another suitable height that permits depression) and enter a reading mode for movement detection. For example, in reading mode, control circuitry may determine from the MEMS actuators 106 that the finger is making contact at the location of a MEMS actuator and mark that location positive. The control circuitry may determine from the MEMS actuators 106 that the finger is not making contact at the location of a MEMS actuator and mark that location negative. In some embodiments, the control circuitry may determine the gesture movement by storing (e.g., in storage circuitry 608 of FIG. 6, 714 of FIGS. 7, and 722 of FIG. 7) only the edge MEMS actuators marked positive to save storage capacity. In some embodiments, the control circuitry may repeat the contact determination at an interval (e.g., 30 times per second) to track the moving finger. It is contemplated that MEMS pressure sensors 164 of FIG. 1C, or another suitable sensor, or combination thereof may also be used in this process to detect movement.

Figure 4:
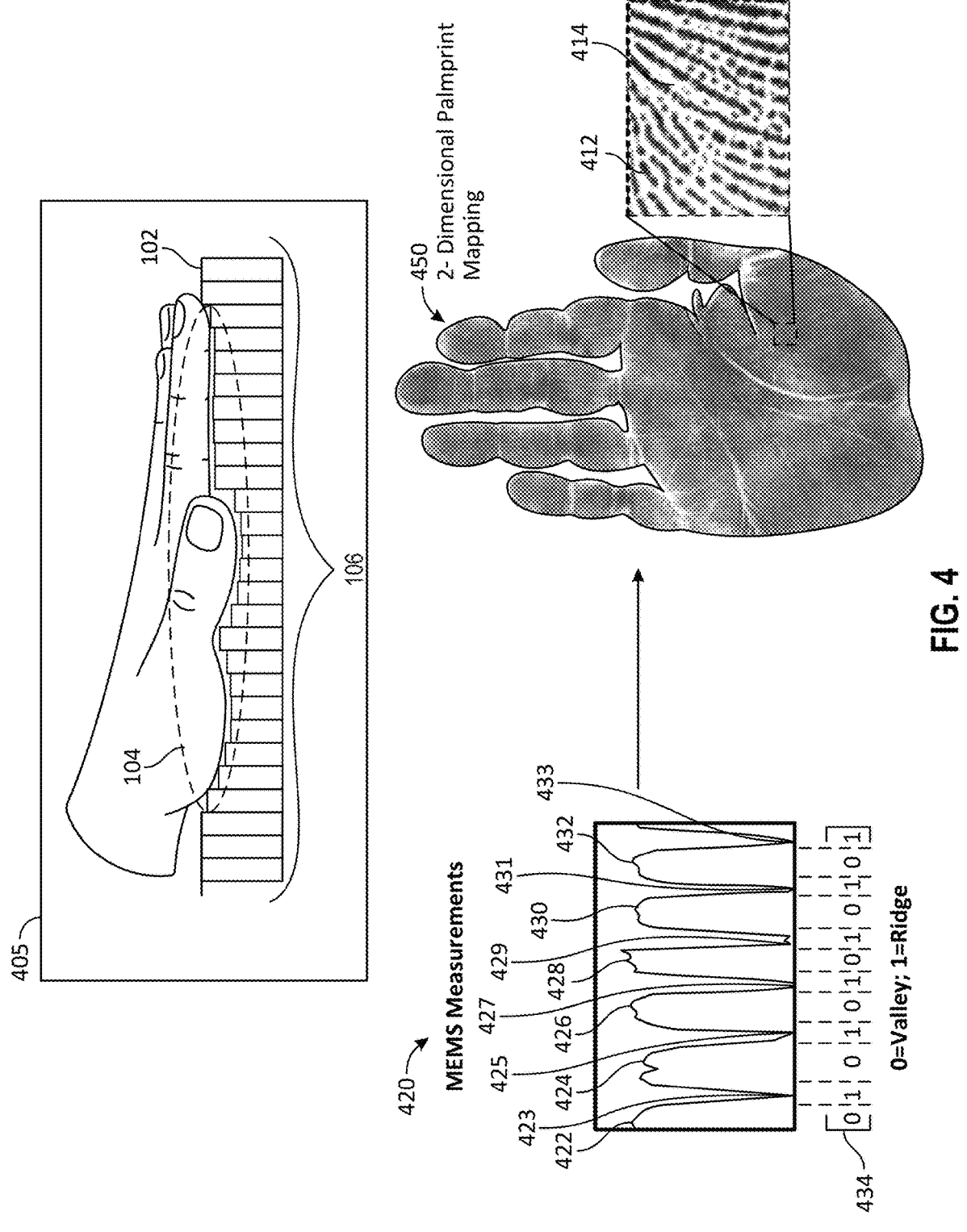
FIG. 4 depicts a schematic illustration of palmprint measurement via MEMS actuators, in accordance with some embodiments of this disclosure.

FIG. 4 depicts a schematic illustration of palmprint measurement via MEMS actuators, in accordance with some embodiments of this disclosure.

In some embodiments, an array of MEMS actuators 106 is sufficiently large to detect multiple fingers or the palm of a hand, thus providing additional combinations for the authentication process. In some embodiments, registered data (e.g., fingerprint profiles, palmprint profiles, movement profiles, or another suitable registration data, or combinations thereof) may be associated with a user profile, a display, a device, a platform, an application, or another suitable user identifiable entity, such that control circuitry may compare the palmprint profile to a registered palmprint profile. For example, MEMS actuators 106 may measure a palmprint profile of a hand through the depression pattern of the MEMS actuators 106, shown in panel 405, or through the actuation height or position of the MEMS actuators 106 (e.g., similar to descriptions of panel 115 of FIG. 1A). In some embodiments, MEMS actuators 106 may be used in combination with a liveliness detection sensor (e.g., pulse sensor, temperature sensor) to ensure a real palm is being measured. In some embodiments, the control circuitry determines whether the palmprint profile corresponds to a registered palmprint profile and performs the authenticating based at least in part on determining that the palmprint profile corresponds to the registered palmprint profile. In some embodiments, the fingerprint authentication and the palm print authentication may both be used for additional security.

In some embodiments, control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) of a device (e.g., a display, or other suitable surface of a device, for example another suitable surface of user equipment 706, 707, 708, 710, or 713 of FIG. 7) may detect one or more points of contact 104 on surface 102. For example, the control circuitry may detect a palm, friction ridge skin of a palm, or the like. For example, control circuitry may determine a palm is touching the surface 102 of the device by detecting a depression of one or more MEMS actuators, and/or through a touch sensor (e.g., piezoelectric sensor, capacitive sensor, resistive sensor, optical sensor, ultrasonic sensor, or the like), a force sensor, a proximity sensor, a motion sensor, a photoelectric sensor, a temperature sensor, and/or another suitable sensor or combination thereof. For example, the control circuitry may receive signals (e.g., corresponding to contact measurements) from a plurality of the aforementioned sensors. The control circuitry may compare the measurement, derived from the signals of the sensors, to a threshold and, if the measurement exceeds a threshold, determine that contact is being made at the location of the sensor.

It is contemplated that the methods discussed for FIGS. 1A-1D may be applied for palmprint reading and/or multi-finger reading. As the methods would be identical or substantially similar to those discussed, details will be omitted here for brevity.

FIG. 5A depicts a flowchart of a process 500 for authenticating a user via a fingerprint profile, in accordance with some embodiments of this disclosure. In various embodiments, the individual steps of process 500 may be implemented by one or more components of the devices, systems and methods of FIGS. 1-7 and may be performed in combination with any of the other processes and aspects described herein. Although the present disclosure may describe certain steps of process 500 (and of other processes described herein) as being implemented by certain components of the devices, systems and methods of FIGS. 1-7, this is for purposes of illustration only. It should be understood that other components of the devices, systems and methods of FIGS. 1-7 may implement those steps instead.

It should be understood that device authentication of a user generally includes user registration and storage (e.g., in storage circuitry 608 of FIG. 6, 714 of FIGS. 7, and 722 of FIG. 7) of a fingerprint profile (or other e.g., palmprint profile, movement profile) associated with the user. For example, user registration may include mapping the fingerprint of a user as described in FIGS. 1A-1D. User registration may further include registering additional fingerprints, gestures made along the surface of the device (e.g., as shown in FIG. 3), and/or palmprints (e.g., as shown in FIG. 4). User registration may further include configuring the type of measurement (e.g., depression, actuation, pressure sensing, etc.). User registration may further include configuring one or more locations for measurement of the fingerprint. User registration may further include configuring how the device determines a fingerprint profile match (e.g., configuring the number of minutiae required to confirm a fingerprint match, quality and agreement of features, etc.). Combinations of registrations and/or configurations may further be used to set up the device to provide access, verification, authorization, and/or security.

In some embodiments, at step 502, control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) of a device (e.g., display or other suitable surface of a device, for example another suitable surface of user equipment 706, 707, 708, 710, or 713 of FIG. 7) detects one or more points of contact of a finger of a user with a subset of portions of a plurality of portions of the surface of the device. For example, control circuitry may detect contact through the depression of one or more MEMS actuators or through one or more sensors. In some embodiments, the one or more sensors may include a touch sensor, a force sensor, a proximity sensor, a motion sensor, or a photoelectric sensor. A touch sensor may be one or more of a piezoelectric sensor, a capacitive sensor, a resistive sensor, an optical sensor, an ultrasonic sensor, or another suitable sensor to detect touch, or any combination thereof. In some embodiments, the control circuitry may compare a measurement of one or more of the plurality of sensors to a threshold and determine that the measurement of the one or more of the plurality of sensors is greater than the threshold, which indicates contact has been made with the surface of the device. In some embodiments, multiple fingers, a palm, or any other identifiable topographic surface (e.g., friction ridge skin, a physical passkey, etc.) may be detected at this step. In some embodiments, the MEMS actuators may be embedded in a matrix and vertically positioned to measure the physical curves of a surface of one or more fingers.

In some embodiments, at step 504, control circuitry of a device identifies a first subset of MEMS components of the plurality of MEMS components that correspond to the subset of portions of the surface of the device. For example, control circuitry of a device may identify that the array of 6×6 subpixels, as shown in FIG. 2, are located where contact is made with the device.

In some embodiments, at step 506, control circuitry of a device causes the first subset of MEMS components to actuate (e.g., raise or lower) based at least in part on detecting the one or more points of contact of the finger with the subset of portions of the surface of the device. For example, as shown in panel 105 of FIG. 1A, control circuitry of a device may set the MEMS actuators 106 to a position or height and allows the finger to depress MEMS actuators 106. In another example, as shown in step 222 of FIG. 2, control circuitry of a device may actuate the center three MEMS actuators 208 based on the finger contacting stretchable transparent layer 214 of the surface of the device at the location of the center three MEMS actuators. In some embodiments, the first subset of MEMS components may comprise only the MEMS actuators that are determined to have been contacted via the surface of the device. Additionally or alternatively, the first subset of MEMS components may comprise MEMS actuators that have not been directly determined to have been contacted via the surface of the device. For example, the device may comprise a distribution of MEMS components, where some MEMS components comprise touch sensors for the control circuitry of the device to determine contact and some MEMS components, without touch sensors, are actuated based on adjacently contacted MEMS components with touch sensors. In another example, the device may comprise a distribution of MEMS components, where some MEMS components are MEMS pressure sensors 164 of FIG. 1C for the control circuitry of the device to determine contact and some MEMS components are MEMS actuators 106 of FIG. 1A (e.g., without touch sensors) that are actuated based on adjacently contacted MEMS pressure sensors. The distribution throughout the surface of the device may be such that MEMS components with detection capability are placed at intervals so that detection of the contact and location of a fingerprint area anywhere on the device may be achieved (e.g., 3-5 MEMS components with touch sensors within every 2.5 cm$^2$). The control circuitry of the device may determine, or may be pre-configured with, a fingerprint profile area (e.g., average fingerprint coverage area, such as 1.0-2.5 cm$^2$) and, based on the locations of MEMS components with touch sensors detecting contact, actuate (e.g., raise or lower) both the MEMS components configured to detect contact and adjacent MEMS components without touch sensors that are within the determined fingerprint profile area relative (e.g., centered, disposed around, or adjacent) to the determined points of contact. In some embodiments, the MEMS actuators are actuated in a pattern. For example, the control circuitry may actuate MEMS components around a predicted or determined fingerprint coverage area all at once, sequentially, intermittently, in a wave, in a row pattern, in a columnar pattern or in a diagonal pattern. In some embodiments, control circuitry of a device may have received a touch command to initiate fingerprint scanning and, in response, MEMS actuators of a preconfigured portion of the surface of the device, or the whole device, may actuate.

In some embodiments, at step 508, control circuitry of a device measures, using positions of the first subset of MEMS components, topography (e.g., ridges and valleys) of the finger. For example, control circuitry may retrieve height measurements 120 of MEMS actuators 106 contacting the ridges and valleys of the fingerprint, as shown in FIG. 1B. In some embodiments, control circuitry may store (e.g., in storage circuitry 608 of FIG. 6, 714 of FIGS. 7, and 722 of FIG. 7) height measurements 120.

In some embodiments, control circuitry may retrieve other sensor signals (e.g., pressure measurements, force measurements, distance measurements, optical measurements, audible measurement, electromagnetic measurements, or another suitable sensor signal, or combination thereof), from MEMS pressure sensors or other contact sensors (e.g., touch sensors, force sensors, proximity sensors, motion sensor, a photoelectric sensor) to determine the topography of the finger. For example, MEMS pressure sensors are discussed in further detail in relation to FIGS. 1C and 1D.

In some embodiments, at step 510, control circuitry of a device detects a fingerprint profile of the user based at least in part on the measured topography of the finger. For example, control circuitry of a device may use measurements 120 of MEMS actuators 106 to determine a fingerprint profile through 3D and/or 2D fingerprint mapping, as further discussed in relation to FIGS. 1B and 1D.

In some embodiments, at step 512, control circuitry of a device determines whether the fingerprint profile corresponds to a registered fingerprint profile. In some embodiments, registered data (e.g., fingerprint profiles, palmprint profiles, movement profiles, or another suitable registration data, or combinations thereof) may be associated with a user profile, a display, a device, a platform, an application, or another suitable user identifiable entity, such that control circuitry may compare the fingerprint profile to a registered fingerprint profile. For example, control circuitry of a device may compare minutiae of the detected fingerprint profile with minutiae of a registered fingerprint profile and determine that the fingerprint profile corresponds to a registered fingerprint profile upon detecting a number of matching minutiae (e.g., 8-16 minutiae). The registered fingerprint may, for example, be stored in the memory of the device or display, e.g., based on an initial registration or setup process in which the user is prompted to touch their finger(s) to one or more portions of the device configured to detect the fingerprint profile of the user. In some embodiments, at step 512, control circuitry of a device determines the fingerprint profile does not correspond to a registered fingerprint profile.

In an example, upon determination that the fingerprint profile does not correspond to a registered fingerprint profile, control circuitry may provide feedback, perform the measurement again, and/or provide an alert to a second user device. For example, control circuitry may provide feedback in the form of a text prompt, a visual prompt, a vibration, or another suitable feedback mechanism that alerts the user of no match (e.g., denied access, verification, etc.) and/or to provide instructions (e.g., press harder, clean fingers, etc.). For example, control circuitry may send a text or email to a separate device to inform the user access has been denied at the first device with or without options to approve access or further escalate denial (e.g., alert bank, police, send GPS, etc.).

In some embodiments, at step 512, control circuitry of a device determines the fingerprint profile does correspond to a registered fingerprint profile and proceeds to step 514.

In some embodiments, at step 514, control circuitry of a device authenticates the user based at least in part on determining that the fingerprint profile corresponds to the registered fingerprint profile. For example, control circuitry of a device may grant access to the device; grant access to an application, a resource, or data; authorize a transaction on the device; or provide another suitable verification and/or security authorization.

Figure 5B:
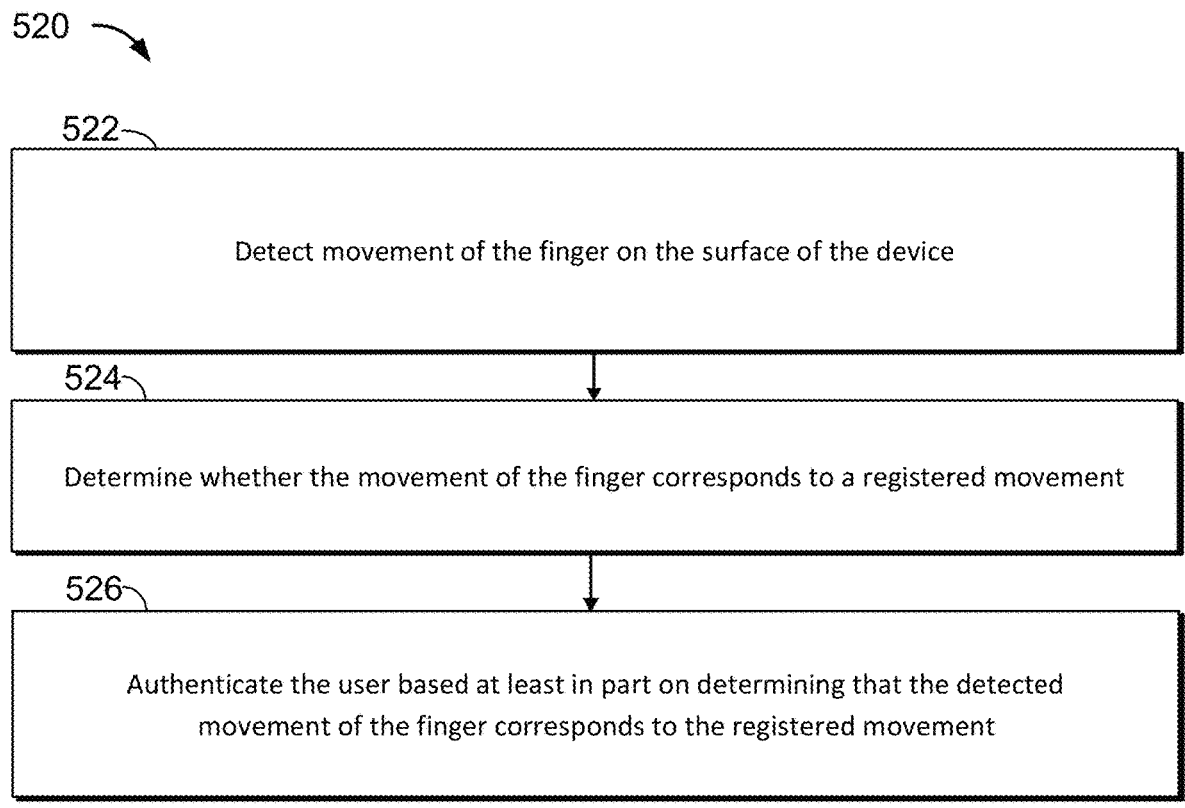
FIG. 5B depicts a flowchart of a process for authenticating a user via a registered movement, in accordance with some embodiments of this disclosure.

FIG. 5B depicts a flowchart of a process 520 for authenticating a user via a registered movement, in accordance with some embodiments of this disclosure. In various embodiments, the individual steps of process 520 may be implemented by one or more components of the devices, systems and methods of FIGS. 1-7 and may be performed in combination with any of the other processes and aspects described herein. Although the present disclosure may describe certain steps of process 520 (and of other processes described herein) as being implemented by certain components of the devices, systems and methods of FIGS. 1-7, this is for purposes of illustration only. It should be understood that other components of the devices, systems and methods of FIGS. 1-7 may implement those steps instead.

In some embodiments, processes 500 of FIG. 5A and 520 of FIG. 5B may be combined. For example, a device may be configured with 2FA, where the 2FA includes (a) scanning a fingerprint that matches a registered fingerprint, and (b) performing a gesture the matched a registered movement. The combination of a fingerprint (e.g., who you are) and a gesture (e.g., what you know) provides additional security when authenticating a user.

In some embodiments, at step 522, control circuitry (e.g., control circuitry 604 of FIG. 6, control circuitry 711 of FIG. 7, control circuitry 718 of FIG. 7, I/O circuitry 602 of FIG. 6, I/O circuitry 712 of FIG. 7, and/or I/O circuitry 720 of FIG. 7) of a device (e.g., display or other suitable surface of a device, for example another suitable surface of user equipment 706, 707, 708, 710, or 713 of FIG. 7) detects movement of the finger on the surface of the device (e.g., as shown in FIG. 3). For example, the device may allow the user to register one or more movements to provide a customizable dual factor authentication method. In some embodiments, the control circuitry may detect the movement of the finger on the surface of the device by detecting one or more points of contact of the finger with one or more adjacent subsets of portions of the surface of the device. In other words, the control circuitry detects that the contact is moving from one subset of MEMS actuators to an adjacent subset of MEMS actuators. In some embodiments, the control circuitry may use only the edges of the determined contact to determine the gesture. For example, the control circuitry may identify one or more second subsets of MEMS components that correspond to one or more edge portions of the one or more adjacent subsets of portions of the surface of the device and use the one or more second subsets of MEMS components to detect a gesture profile of the movement.

In some embodiments, at step 524, control circuitry of a device determines whether the movement of the finger (e.g., detected gesture profile) corresponds to a registered movement. In some embodiments, registered data (e.g., fingerprint profiles, palmprint profiles, movement profiles, or another suitable registration data, or combinations thereof) may be associated with a user profile, a display, a device, a platform, an application, or another suitable user identifiable entity, such that control circuitry may compare the gesture profile to a registered movement. For example, control circuitry of a device may compare the second subsets of MEMS components of the detected gesture profile with stored second subsets of MEMS components of a registered movement and determine that the detected gesture profile corresponds to a registered movement based on the detected gesture profile meeting or exceeding a match threshold (e.g., 80%, 92%, or another suitable threshold). The registered movement may, for example, be stored in the memory of the device or display, e.g., based on an initial registration or setup process in which the user is prompted to move their finger(s) across one or more portions of the device configured to detect the gesture profile of the user. In some embodiments, at step 524, control circuitry of a device determines the gesture profile does not correspond to a registered movement.

In an example, upon determination that the gesture profile does not correspond to a registered movement, control circuitry may provide feedback, request the gesture to be performed again, and/or provide an alert to a second user device. For example, control circuitry may provide feedback in the form of a text prompt, a visual prompt, a vibration, or another suitable feedback mechanism that alerts the user of no match (e.g., denied access, verification, etc.) and/or to provide instructions (e.g., press harder, clean fingers, etc.). For example, control circuitry may send a text or email to a separate device to inform the user access has been denied at the first device with or without options to approve access or further escalate denial (e.g., alert bank, police, send GPS, etc.).

In some embodiments, at step 524, control circuitry of a device determines the movement (e.g., gesture profile) does correspond to a registered movement and proceeds to step 526.

In some embodiments, at step 526, control circuitry of a device authenticates the user based at least in part on determining that the detected movement of the finger corresponds to the registered movement. For example, control circuitry of a device may grant access to the device; grant access to an application, a resource, or data; authorize a transaction on the device; or provide another suitable verification and/or security authorization.

FIG. 6 depicts illustrative user equipment 600 and 601, in accordance with some embodiments of this disclosure. User equipment 600 and 601 may correspond to, e.g., user equipment 201 of FIG. 2 and user equipment 302 of FIG. 3. For example, user equipment 600 may be a smartphone device, a tablet, a computer, a near-eye display device, an XR device, a vehicle display, a vehicle exterior, vehicle locks, a safe box locks or a vault (e.g., at a bank or residence), payment terminals, unlocking a smart phone or tablet or other mobile device or other device, security checkpoints, a device providing access to a physical space, digital resources or other resources, via biometric authentication, or another suitable device capable of providing a MEMS embedded surface for authentication, e.g., locally or over a communication network. In another example, user equipment 601 may be a user television equipment system, gaming system, processor unit, computing unit, or other device. User equipment 601 may include set-top box 615. Set-top box 615 may be communicatively connected to microphone 616, audio output equipment 614 (e.g., speaker or headphones), and display 612. In some embodiments, microphone 616 may receive audio corresponding to a voice of a user and/or ambient audio data. In some embodiments, display 612 may be a television display, a computer display, a smartphone display, HMD, glasses, goggles, vehicle display, or any display of the aforementioned user equipment. In some embodiments, set-top box 615 may be communicatively connected to user input interface 610. In some embodiments, user input interface 610 may be a remote-control device, sensors that detect user commands, or a touchscreen display. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path (e.g., I/O path 602). More specific implementations of user equipment are discussed below in connection with FIG. 7. In some embodiments, user equipment 600 may comprise sensors (e.g., touch sensors, gyroscope or gyrometer, accelerometer, or camera, etc.), and/or a GPS module (e.g., in communication with one or more servers and/or cell towers and/or satellites) to ascertain a location of user equipment 600. In some embodiments, user equipment 600 comprises a rechargeable battery that is configured to provide power to the components of the device.

Each one of user equipment 600 and user equipment 601 may receive content and data via I/O path 602. I/O path 602 may provide content (e.g., broadcast programming, on-demand programming, internet content, content available over a local area network (LAN) or wide area network (WAN), and/or other content) and data to control circuitry 604, which may comprise processing circuitry 606 and storage circuitry 608. Control circuitry 604 may be used to send and receive commands, requests (e.g., including authentication), and other suitable data using I/O path 602, which may comprise I/O circuitry. I/O path 602 may connect control circuitry 604 to one or more communications paths (described below). I/O functions may be provided by one or more of these communications paths but are shown as a single path in FIG. 6 to avoid overcomplicating the drawing. While set-top box 615 is shown in FIG. 6 for illustration, another suitable computing device having processing circuitry, control circuitry, and storage may be used in accordance with the present disclosure. For example, set-top box 615 may be replaced by, or complemented by, a personal computer (e.g., a notebook, a laptop, a desktop, user equipment 707 of FIG. 7, etc.), a smartphone (e.g., user equipment 708 of FIG. 7), a television (e.g., user equipment 710 of FIG. 7), an XR device (user equipment 706 of FIG. 7), a tablet, a vehicle (e.g., user equipment 713 of FIG. 7) a network-based server hosting a user-accessible client device, a non-user-owned device, another suitable device, or any combination thereof.

Control circuitry 604 may be based on suitable control circuitry, such as, for example processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or another suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i7 processor and an Intel Core i9 processor). In some embodiments, control circuitry 604 executes instructions for the authentication application (as described in connection with FIGS. 1-7) stored in memory (e.g., storage circuitry 608). Specifically, control circuitry 604 may be instructed by the authentication application to perform the functions discussed above and below. In some implementations, processing or actions performed by control circuitry 604 may be based on instructions received from the authentication application.

In client/server-based embodiments, control circuitry 604 may include communications circuitry suitable for communicating with a server or other networks or servers. The authentication application may be a stand-alone application implemented on a device or a server. The authentication application may be implemented as software or a set of executable instructions. The instructions for performing any of the embodiments discussed herein of the authentication application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage circuitry 608, and executed by control circuitry 604 of a user equipment 600.

In some embodiments, the authentication application may be a client/server application where only the client application resides on user equipment 600, and a server application resides on an external server (e.g., server 704 of FIG. 7 and/or authorization content source 702 of FIG. 7). For example, the authentication application may be implemented partially as a client application on control circuitry 604 of user equipment 600 and partially on server 704 as a server application running on control circuitry 711. Server 704 may be a part of a local area network with one or more of user equipment 600, or may be part of a cloud computing environment accessed via the internet. In a cloud computing environment, various types of computing services for performing searches on the internet or informational databases, providing video communication capabilities, providing storage (e.g., for a database) or parsing data (e.g., using machine learning algorithms) are provided by a collection of network-accessible computing and storage resources (e.g., server 704 and/or an edge computing device 716), referred to as "the cloud." User equipment 600 may be a cloud client that relies on the cloud computing capabilities from server 704 to determine whether processing should be offloaded from the local device, and facilitate such offloading. The client application may instruct control circuitry 604 to adjust authentication parameters for better profile matching.

Control circuitry 604 may include communications circuitry suitable for communicating with a server, edge computing systems and devices, a table or database server, or other networks or servers. The instructions for carrying out the above mentioned functionality may be stored on a server (which is described in more detail in connection with FIG. 7). Communications circuitry may include a cable modem, an integrated services digital network (ISDN) modem, a digital subscriber line (DSL) modem, a telephone modem, an Ethernet card, or a wireless modem for communications with other equipment, or another suitable communications circuitry. Such communications may involve the internet or another suitable communication networks or paths (which is described in more detail in connection with FIG. 7). In addition, communications circuitry may include circuitry that enables peer-to-peer communication of user equipment, or communication of user equipment in locations remote from each other (described in more detail below).

Memory may be an electronic storage device provided as storage circuitry 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or another suitable fixed or removable storage devices, and/or any combination of the same. Storage circuitry 608 may be used to store various types of data described herein as well as authentication application data described above. Nonvolatile memory may also be used (e.g., to launch a boot-up routine and other instructions). Cloud-based storage, described in relation to FIG. 6, may be used to supplement storage circuitry 608 or instead of storage circuitry 608. Non-transitory memory may store instructions that, when executed by control circuitry, I/O circuitry, another suitable circuitry or combination thereof, executes functions of a authentication application as described above.

Control circuitry 604 may include video generating circuitry and tuning circuitry, such as one or more MPEG-2 decoders or HEVC decoders or another suitable digital decoding circuitry, high-definition tuners, one or more analog tuners, or another suitable tuning or video circuits or combinations of such circuits. Encoding circuitry (e.g., for converting over-the-air, analog, or digital signals to MPEG or HEVC or another suitable signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment 600 and 601 to receive and to display, to play, or to record content. The tuning and encoding circuitry may also be used to receive video and/or audio communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage circuitry 608 is provided as a separate device from user equipment 600, the tuning and encoding circuitry (including multiple tuners) may be associated with storage circuitry 608.

Control circuitry 604 may receive instruction from a user by way of user input interface 610. User input interface 610 may be, e.g., a remote control, mouse, trackball, keypad, keyboard, touchscreen, touchpad, stylus input, joystick, voice recognition interface, sensor interface (e.g., to measure fingerprints), or another suitable user input interface. Display 612 may be provided as a stand-alone device or integrated with other elements of each one of user equipment 600 and user equipment 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, sensors, or any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612, and/or an HMD. Display 612 may be one or more of a monitor, television, liquid crystal display (LCD) for an HMD, mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, projection, or another suitable equipment for displaying visual images. A video card or graphics card may generate the output to the display 612. Audio output equipment 614 may be provided as integrated with other elements of each one of user equipment 600 and user equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may provide voice commands that are received by a microphone and recognized by control circuitry 604. Camera 618 may be, e.g., a video camera integrated with the equipment or externally connected or another suitable camera device. Camera 618 may be a digital camera comprising a charge-coupled device (CCD) and/or a complementary metal-oxide semiconductor (CMOS) image sensor. Camera 618 may be an analog camera that converts to digital images via a video card.

The authentication application may be implemented using a suitable architecture. For example, it may be a stand-alone application wholly implemented on each one of user equipment 600 and user equipment 601. In such an approach, instructions of the application may be stored locally (e.g., in storage circuitry 608), and data for use by the application is downloaded on a periodic basis (e.g., from an out-of-band feed, from an internet resource, or using another suitable approach). Control circuitry 604 may retrieve instructions of the application from storage circuitry 608 and process the instructions to provide video conferencing functionality and generate any of the displays discussed herein. Based on the processed instructions, control circuitry 604 may determine what action to perform when input is received from user input interface 610. For example, movement of a cursor or selection field on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), flash drives, NVMe, NAS, etc.

Control circuitry 604 may allow a user to provide user profile information or may automatically compile user profile information. For example, control circuitry 604 may access and monitor network data, video data, audio data, processing data, content consumption data, and/or another suitable data being accessed by a user. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the authentication application is a client/server-based application. Data for use by a thick or thin client implemented on each one of user equipment 600 and user equipment 601 may be retrieved on demand by issuing requests to a server remote to each one of user equipment 600 and user equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on user equipment 600. This way, the processing of the instructions is performed remotely by the server while the resulting displays (e.g., that may include text, a keyboard, or other visuals) are provided locally on user equipment 600. User equipment 600 may receive inputs from the user via user input interface 610 and transmit those inputs to the remote server for processing and generating the corresponding displays. For example, user equipment 600 may transmit a communication to the remote server indicating that a fingerprint was measured via user input interface 610.

The remote server may process instructions in accordance with that input and generate a display of the application corresponding to the input (e.g., providing access to the display of the device, authorizing a transaction made by the device). The generated display is then transmitted to user equipment 600 for presentation to the user.

In some embodiments, the authentication application may be downloaded and interpreted or otherwise run by an interpreter or virtual machine (e.g., run by control circuitry 604). In some embodiments, the authentication application may be encoded in the ETV Binary Interchange Format (EBIF), received by control circuitry 604 as part of a suitable feed, and interpreted by a user agent running on control circuitry 604. For example, the authentication application may be an EBIF application. In some embodiments, the authentication application may be defined by a series of JAVA-based files that are received and run by a local virtual machine or other suitable middleware executed by control circuitry 604. In some of such embodiments (e.g., those employing MPEG-2, MPEG-4, HEVC or another suitable digital media encoding schemes), the authentication application may be, for example, encoded and transmitted in an MPEG-2 object carousel with the MPEG audio and video packets of a program.

FIG. 7 depicts an illustrative user equipment system 700, in accordance with some embodiments of this disclosure. User equipment 706, 707, 708, 710, or 713 (which may correspond to user equipment 201 of FIG. 2 and user equipment 302 of FIG. 3) may be coupled to communication network 709. Communication network 709 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports internet communications (e.g., IPTV), free-space connections (e.g., for broadcast or other wireless signals), or another suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 709.

System 700 may comprise authorization content source 702, one or more servers 704, and/or one or more edge computing devices 716 (e.g., included as part of an edge computing system). In some embodiments, the authentication application may be executed at one or more of control circuitry 711 of server 704 (and/or control circuitry of user equipment 706, 707, 708, 710, 713 and/or control circuitry 718 of edge computing device 716). In some embodiments, data matrix 211 of FIG. 2, may be stored at database 705, server 704, storage 722 and/or at one or more of user equipment devices 706, 707, 708, 710, 713.

In some embodiments, server 704 may include control circuitry 711 and storage circuitry 714 (e.g., RAM, ROM, Hard Disk, Removable Disk, etc.). Storage 714 may store one or more databases. Server 704 may also include an I/O path 712. In some embodiments, I/O path 712 is an I/O circuitry. I/O circuitry may be a NIC card, audio output device, mouse, keyboard card, voice recognition interface, touchscreen, sensor interface, another suitable I/O circuitry device or combination thereof. I/O path 712 may provide video conferencing data, device information, or other data, over a local area network (LAN) or wide area network (WAN), and/or other content and data to control circuitry 711, which may include processing circuitry, and storage circuitry 714. Control circuitry 711 may be used to send and receive commands, requests, and other suitable data using I/O path 712, which may comprise I/O circuitry. I/O path 712 may connect control circuitry 711 to one or more communications paths.

Control circuitry 711 may be based on suitable control circuitry such as, e.g., one or more microprocessors, micro-controllers, digital signal processors, programmable logic devices, field-programmable gate arrays (FPGAs), application-specific integrated circuits (ASICs), etc., and may include a multi-core processor (e.g., dual-core, quad-core, hexa-core, or another suitable number of cores) or super-computer. In some embodiments, control circuitry 711 may be distributed across multiple separate processors or pro-cessing units, for example, multiple of the same type of processing units (e.g., two Intel Core i7 processors) or multiple different processors (e.g., an Intel Core i7 processor and an Intel Core i9 processor). In some embodiments, control circuitry 711 executes instructions for an emulation system application stored in memory (e.g., the storage circuitry 714). Memory may be an electronic storage device provided as storage circuitry 714 that is part of control circuitry 711. Memory may store instruction to run the authentication application.

Edge computing device 716 may comprise control cir-cuitry 718, I/O path 720 and storage 722, which may be implemented in a similar manner as control circuitry 711, I/O path 712 and storage 724, respectively of server 704. Edge computing device 716 may be configured to be in communication with one or more of user equipment devices 706, 707, 708, 710, 713 and video server 704 over commu-nication network 706, and may be configured to perform processing tasks in connection with ongoing processing of video data. In some embodiments, a plurality of edge computing devices 716 may be strategically located at various geographic locations, and may be mobile edge computing devices configured to provide processing support for mobile devices at various geographical regions.

The terminology used herein is for the purpose of describ-ing particular embodiments only and is not intended to be limiting of the disclosure.

It is to be understood that various terms relating to latency may be understood as set forth in the following. These latency terms are not intended to be limiting but exemplary. "High" latency is, e.g., about 45 seconds or more. An example of this is DASH and/or HLS with 10-second segments. "Typical" latency ranges, e.g., from about 10 to about 45 seconds. This can be seen in DASH and/or HLS with 6-second segments. DASH and/or HLS with 2-second segments falls between low latency and typical latency. "Low" latency is, e.g., between about 1 and 10 seconds. Examples include DASH and/or HLS with fragmented or 1-second segments, cable, IPTV, satellite, over-the-air broadcast, social media, messaging, live sports, game streaming, and eSports. Online gambling, betting, and auc-tioning fall between ultra-low latency and low latency. "Ultra-low" latency is, e.g., about 100 milliseconds to about 1 second. Cloud gaming, videoconferencing, and Voice over IP (VOIP) straddle the line between near-real-time latency and ultra-low latency. "Near-real-time" latency is, e.g., less than about 100 milliseconds. An example of this is surgical robots. Other examples include different game genres. For example, for a role playing fantasy game, a latency of less than about 100 milliseconds is likely sufficient. Whereas, in a first-person shooter game, end-to-end latency below about 40 milliseconds is desirable. In another example, VR cloud gaming pushes these latencies even lower to below about 20 milliseconds.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be in the order of milliseconds or microseconds, depending on the application and nature of the processing. Relatively longer delays (e.g., greater than a millisecond) may result due to communication or processing delays, particularly in remote and cloud-computing environments.

As used herein, the singular forms "a," "an," and "the" are intended to include the plural forms as well, unless the context clearly indicates otherwise. It will be further under-stood that the terms "comprises" and/or "comprising," when used in this specification, specify the presence of stated features, integers, steps, operations, elements, and/or com-ponents, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random-access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed above are intended to be illustrative and not limiting. One skilled in the art would appreciate that the actions of the processes discussed herein may be omitted, modified, combined and/or rearranged, and any additional actions may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A device comprising:
   a plurality of micro-electromechanical system (MEMS) components, wherein each respective MEMS component of the plurality of MEMS components is configured to actuate to cause one or more portions of a surface of the device to move; and
   control circuitry configured to:

detect one or more points of contact of a finger of a user with a subset of portions of a plurality of portions of the surface of the device;
   identify a first subset of MEMS components of the plurality of MEMS components that correspond to the subset of portions of the surface of the device;
   cause the first subset of MEMS components to actuate based at least in part on detecting the one or more points of contact of the finger with the subset of portions of the surface of the device;
   measure, using positions of the first subset of MEMS components, topography of the finger;
   detect a fingerprint profile of the user based at least in part on the measured topography of the finger;
   determine whether the fingerprint profile corresponds to a registered fingerprint profile;
   detect one or more points of contact of the finger with one or more adjacent subsets of portions of the plurality of portions of the surface of the device;
   identify one or more second subsets of MEMS components of the plurality of MEMS components that correspond to one or more edge portions of the one or more adjacent subsets of portions of the surface of the device;
   use the one or more second subsets of MEMS components to detect a gesture profile;
   determine whether the gesture profile corresponds to a registered movement; and
   authenticate the user based at least in part on determining that the fingerprint profile corresponds to the registered fingerprint profile and that the gesture profile corresponds to the registered movement.

2. The device of claim 1, wherein:
   the first subset of MEMS components of the plurality of MEMS components comprises: (a) one or more second MEMS components that correspond to the subset of portions of the surface of the device, at which the one or more points of contact are detected, and (b) one or more third MEMS components that correspond to a fingerprint profile area generally centered relative to the first subset of MEMS components; and
   wherein the control circuitry is further configured to cause the one or more second MEMS components and the one or more third MEMS components to actuate in a pattern comprising at least one of actuating the MEMS components all at once, actuating the MEMS components in a sequence, actuating the MEMS components intermittently, actuating the MEMS components in a wave pattern, actuating the MEMS components in a ring pattern, actuating the MEMS components in a row pattern, actuating the MEMS components in a columnar pattern, or actuating the MEMS components in a diagonal pattern.

3. The device of claim 1, wherein the control circuitry is further configured to:
   detect one or more points of contact of a palm of the user with a second subset of portions of the plurality of portions of the surface of the device;
   identify a second subset of MEMS components of the plurality of MEMS components that correspond to the second subset of portions of the surface of the device;
   cause the second subset of MEMS components to actuate based at least in part on detecting the one or more points of contact of the palm with the second subset of portions of the surface of the device;
   measure, using positions of the second subset of MEMS components, topography of the palm;

detect a palmprint profile of the user based at least in part on the measured topography of the palm;

determine whether the palmprint profile corresponds to a registered palmprint profile; and wherein, to authenticate the user, the control circuitry is further configured to determine that the palmprint profile corresponds to the registered palmprint profile.

4. The device of claim 1, further comprising:

a plurality of sensors configured to provide signals used to detect the one or more points of contact of the finger of the user;

wherein, to detect the one or more points of contact of the finger with the subset of portions of the surface of the device, the control circuitry is further configured to:

compare a measurement derived from a signal from one or more of the plurality of sensors to a threshold; and determine that the measurement is greater than the threshold.

5. The device of claim 4, wherein the plurality of sensors comprise at least one of a touch sensor, a force sensor, a proximity sensor, a motion sensor, or a photoelectric sensor.

6. The device of claim 1, wherein the control circuitry is further configured to:

set the first subset of MEMS components to an initial height;

determine whether the initial height of each of one or more MEMS components of the first subset of MEMS components has changed to a subsequent height; and use a binary representation corresponding to a) the initial height or b) the subsequent height for each of the first subset of MEMS components to generate a 2D mapping of the finger.

7. The device of claim 1, wherein, to cause the first subset of MEMS components to actuate, the control circuitry is further configured to:

set the first subset of MEMS components to a first height;

cause the first subset of MEMS components to be raised with respect to the finger in contact with the subset of portions of the surface of the device by causing incremental actuation of each of the first subset of MEMS components to a second height corresponding with contact with the finger; and use each second height of each of the first subset of MEMS components to measure topography of the finger.

8. The device of claim 1, wherein the plurality of portions of the surface of the device comprise a plurality of display pixels.

9. The device of claim 1, wherein the finger is a first finger, the subset of portions of the surface of the device is a first subset of portions, and the control circuitry is further configured to:

detect one or more points of contact of a second finger with a second subset of portions of the plurality of portions of the surface of the device, at substantially a same time as detecting the one or more points of contact of the first finger with the first subset of portions;

identify a second subset of MEMS components of the plurality of MEMS components that correspond to the second subset of portions;

cause the second subset of MEMS components to actuate based at least in part on detecting the one or more points of contact of the second finger with the second subset of portions of the surface of the device;

measure, using positions of the second subset of MEMS components, topography of the second finger;

detect a second fingerprint profile of the user based at least in part on the measured topography of the second finger;

determine whether the second fingerprint profile corresponds to a registered second fingerprint profile; and wherein, to authenticate the user, the control circuitry is further configured to determine the second fingerprint profile corresponds to the registered second fingerprint profile.

10. The device of claim 1, wherein the control circuitry is further configured to:

determine that the finger, while in contact with the subset of portions of the surface of the device, is not moving; and perform the identifying of the first subset of MEMS components of the plurality of MEMS components, and the causing of the first subset of MEMS components to be actuated, based at least in part on the determination that the finger is not moving while in contact with the subset of portions of the surface of the device.

11. A method comprising:

detecting one or more points of contact of a finger of a user with a subset of portions of a plurality of portions of a surface of a device;

identifying a first subset of MEMS components of a plurality of MEMS components that correspond to the subset of portions of the surface of the device, wherein each respective MEMS component of the plurality of MEMS components is configured to actuate to cause one or more portions of the surface of the device to move;

causing the first subset of MEMS components to actuate based at least in part on detecting the one or more points of contact of the finger with the subset of portions of the surface of the device;

measuring, using positions of the first subset of MEMS components, topography of the finger;

detecting a fingerprint profile of the user based at least in part on the measured topography of the finger;

determining whether the fingerprint profile corresponds to a registered fingerprint profile;

detecting one or more points of contact of the finger with one or more adjacent subsets of portions of the plurality of portions of the surface of the device;

identifying one or more second subsets of MEMS components of the plurality of MEMS components that correspond to one or more edge portions of the one or more adjacent subsets of portions of the surface of the device;

using the one or more second subsets of MEMS components to detect a gesture profile;

determining whether the gesture profile corresponds to a registered movement; and authenticating the user based at least in part on determining that the fingerprint profile corresponds to the registered fingerprint profile and that the gesture profile corresponds to the registered movement.

12. The method of claim 11, wherein:

the first subset of MEMS components of the plurality of MEMS components comprises: (a) one or more second MEMS components that correspond to the subset of portions of the surface of the device, at which the one or more points of contact are detected, and (b) one or more third MEMS components that correspond to a fingerprint profile area generally centered relative to the first subset of MEMS components; and wherein the method further comprises:

causing the one or more second MEMS components and the one or more third MEMS components to actuate in a pattern comprising at least one of actuating the MEMS components all at once, actuating the MEMS components in a sequence, actuating the MEMS components intermittently, actuating the MEMS components in a wave pattern, actuating the MEMS components in a ring pattern, actuating the MEMS components in a row pattern, actuating the MEMS components in a columnar pattern, or actuating the MEMS components in a diagonal pattern.

13. The method of claim 11, further comprising:

detecting one or more points of contact of a palm of the user with a second subset of portions of the plurality of portions of the surface of the device;

identifying a second subset of MEMS components of the plurality of MEMS components that correspond to the second subset of portions of the surface of the device;

causing the second subset of MEMS components to actuate based at least in part on detecting the one or more points of contact of the palm with the second subset of portions of the surface of the device;

measuring, using positions of the second subset of MEMS components, topography of the palm;

detecting a palmprint profile of the user based at least in part on the measured topography of the palm;

determining whether the palmprint profile corresponds to a registered palmprint profile; and wherein the authenticating the user is based at least in part on determining that the palmprint profile corresponds to the registered palmprint profile.

14. The method of claim 11, wherein the detecting one or more points of contact of the finger further comprises:

comparing a measurement, derived from a signal from one or more of a plurality of sensors, to a threshold, wherein the one or more of the plurality of sensors are configured to provide signals used to detect the one or more points of contact of the finger of the user; and determining that the measurement is greater than the threshold.

15. The method of claim 14, wherein the plurality of sensors comprise at least one of a touch sensor, a force sensor, a proximity sensor, a motion sensor, or a photoelectric sensor.

16. The method of claim 11, further comprising:

setting the first subset of MEMS components to an initial height;

determining whether the initial height of each of one or more MEMS components of the first subset of MEMS components has changed to a subsequent height; and using a binary representation corresponding to a) the initial height or b) the subsequent height for each of the first subset of MEMS components to generate a 2D mapping of the finger.

17. A non-transitory computer readable medium having instructions encoded thereon that, when executed by control circuitry, cause the control circuitry to:

detect one or more points of contact of a finger of a user with a subset of portions of a plurality of portions of a surface of a device;

identify a first subset of MEMS components of a plurality of MEMS components that correspond to the subset of portions of the surface of the device, wherein each respective MEMS component of the plurality of MEMS components is configured to actuate to cause one or more portions of the surface of the device to move;

cause the first subset of MEMS components to actuate based at least in part on detecting the one or more points of contact of the finger with the subset of portions of the surface of the device;

measure, using positions of the first subset of MEMS components, topography of the finger;

detect a fingerprint profile of the user based at least in part on the measured topography of the finger;

determine whether the fingerprint profile corresponds to a registered fingerprint profile;

detect one or more points of contact of the finger with one or more adjacent subsets of portions of the plurality of portions of the surface of the device;

identify one or more second subsets of MEMS components of the plurality of MEMS components that correspond to one or more edge portions of the one or more adjacent subsets of portions of the surface of the device;

use the one or more second subsets of MEMS components to detect a gesture profile;

determine whether the gesture profile corresponds to a registered movement; and authenticate the user based at least in part on determining that the fingerprint profile corresponds to the registered fingerprint profile and that the gesture profile corresponds to the registered movement.

18. The non-transitory computer readable medium of claim 17, wherein:

the first subset of MEMS components of the plurality of MEMS components comprises: (a) one or more second MEMS components that correspond to the subset of portions of the surface of the device, at which the one or more points of contact are detected, and (b) one or more third MEMS components that correspond to a fingerprint profile area generally centered relative to the first subset of MEMS components; and wherein execution of the instructions further causes the control circuitry to cause the one or more second MEMS components and the one or more third MEMS components to actuate in a pattern comprising at least one of actuating the MEMS components all at once, actuating the MEMS components in a sequence, actuating the MEMS components intermittently, actuating the MEMS components in a wave pattern, actuating the MEMS components in a ring pattern, actuating the MEMS components in a row pattern, actuating the MEMS components in a columnar pattern, or actuating the MEMS components in a diagonal pattern.

19. The non-transitory computer readable medium of claim 17, wherein execution of the instructions further causes the control circuitry to:

detect one or more points of contact of a palm of the user with a second subset of portions of the plurality of portions of the surface of the device;

identify a second subset of MEMS components of the plurality of MEMS components that correspond to the second subset of portions of the surface of the device;

cause the second subset of MEMS components to actuate based at least in part on detecting the one or more points of contact of the palm with the second subset of portions of the surface of the device;

measure, using positions of the second subset of MEMS components, topography of the palm;

detect a palmprint profile of the user based at least in part on the measured topography of the palm;

determine whether the palmprint profile corresponds to a registered palmprint profile; and wherein, to authenticate the user, the control circuitry is further configured to determine that the palmprint profile corresponds to the registered palmprint profile.

20. The non-transitory computer readable medium of claim 17, wherein execution of the instructions further causes the control circuitry configured to detect the one or more points of contact of the finger with the subset of portions of the surface of the device to:

compare a measurement derived from a signal from one or more of a plurality of sensors to a threshold, wherein the plurality of sensors are configured to provide signals used to detect the one or more points of contact of the finger of the user; and determine that the measurement is greater than the threshold.

* * * * *